US010761280B2

(12) United States Patent
Vallance et al.

(10) Patent No.: US 10,761,280 B2
(45) Date of Patent: Sep. 1, 2020

(54) HERMETIC OPTICAL SUBASSEMBLY

(71) Applicant: NANOPRECISION PRODUCTS, INC., Camarillo, CA (US)

(72) Inventors: Robert Ryan Vallance, Newbury Park, CA (US); Jeremy Burke, Los Angeles, CA (US); Rand Dannenberg, Newbury Park, CA (US)

(73) Assignee: CUDOQUANTA FLORIDA, INC, Sarasota, FL (US)

( * ) Notice: Subject to any disclaimer, the term of this patent is extended or adjusted under 35 U.S.C. 154(b) by 0 days.

(21) Appl. No.: 16/378,308

(22) Filed: Apr. 8, 2019

(65) Prior Publication Data

US 2020/0003974 A1    Jan. 2, 2020

Related U.S. Application Data

(63) Continuation of application No. 15/880,462, filed on Jan. 25, 2018, now abandoned, which is a
(Continued)

(51) Int. Cl.
*G02B 6/42* (2006.01)
*G02B 6/38* (2006.01)
(Continued)

(52) U.S. Cl.
CPC ......... *G02B 6/4251* (2013.01); *G02B 6/2938* (2013.01); *G02B 6/29367* (2013.01);
(Continued)

(58) Field of Classification Search
None
See application file for complete search history.

(56) References Cited

U.S. PATENT DOCUMENTS

| 4,871,224 A | 10/1989 | Karstensen et al. |
| 5,163,113 A | 11/1992 | Melman |

(Continued)

FOREIGN PATENT DOCUMENTS

| WO | 2006134675 | 12/2006 |
| WO | 2015026335 | 2/2015 |

OTHER PUBLICATIONS

International Search Report of Counterpart PCT International Application No. PCT/US2016/058554.
(Continued)

*Primary Examiner* — Rhonda S Peace
(74) *Attorney, Agent, or Firm* — Liu & Liu

(57) ABSTRACT

A hermetic optical subassembly includes an optical bench having a mirror directing optical signals to/from an optical waveguide, a carrier supporting a photonic device, and an intermediate optical bench having a mirror directing optical signals between the photonic device and the optical bench. The optical bench and the intermediate optical bench optically aligns the photonic device to the waveguide along a desired optical path. In one embodiment, the photonic device is an edge emitting laser (EML). The mirror of the optical bench may be passively aligned with the mirror of the intermediate optical bench. The assembled components are hermetically sealed. The body of the optical benches are preferably formed by stamping a malleable metal material to form precise geometries and surface features. In a further aspect, the hermetic optical subassembly integrates a multiplexer/demultiplexer, for directing optical signals between a single optical fiber and a plurality of photonic devices.

20 Claims, 15 Drawing Sheets

Related U.S. Application Data continuation of application No. 15/333,184, filed on Oct. 24, 2016, now Pat. No. 9,880,366, which is a continuation-in-part of application No. 15/236,390, filed on Aug. 12, 2016, now Pat. No. 9,864,145, which is a continuation-in-part of application No. 15/077,816, filed on Mar. 22, 2016, now abandoned.

(60) Provisional application No. 62/245,878, filed on Oct. 23, 2015.

(51) Int. Cl.
*G02B 6/293* (2006.01)
*H04B 10/50* (2013.01)
*G02B 6/36* (2006.01)

(52) U.S. Cl.
CPC ........... *G02B 6/3881* (2013.01); *G02B 6/423* (2013.01); *G02B 6/4214* (2013.01); *G02B 6/4215* (2013.01); *G02B 6/4257* (2013.01); *H04B 10/501* (2013.01); *G02B 6/3652* (2013.01); *G02B 6/3696* (2013.01); *G02B 6/4249* (2013.01); *G02B 6/4255* (2013.01)

(56) References Cited

U.S. PATENT DOCUMENTS

| | | | |
|---|---|---|---|
| 5,479,540 A | 12/1995 | Boudreau | |
| 5,577,142 A | 11/1996 | Mueller-Fiedler | |
| 5,911,022 A * | 6/1999 | Plickert | G02B 6/4249 385/49 |
| 6,516,115 B1 | 2/2003 | Fujita et al. | |
| 6,637,947 B2 | 10/2003 | Melchior et al. | |
| 6,757,308 B1 | 6/2004 | Eldring et al. | |
| 6,870,976 B2 | 3/2005 | Chen et al. | |
| 6,960,032 B2 | 11/2005 | Eldring et al. | |
| 7,198,416 B2 | 4/2007 | Ray et al. | |
| 7,298,941 B2 | 11/2007 | Palen | |
| 7,311,449 B2 | 12/2007 | Barnoski | |
| 7,343,770 B2 | 3/2008 | Barnoski | |
| 7,800,734 B2 | 9/2010 | Komatsuda | |
| 7,832,944 B2 | 11/2010 | Hosking et al. | |
| 7,959,975 B2 | 6/2011 | Millward | |
| 8,186,892 B2 | 5/2012 | Hosking et al. | |
| 8,434,872 B2 | 5/2013 | Maekawa | |
| 8,488,244 B1 | 7/2013 | Li | |
| 8,540,437 B2 | 9/2013 | Lee et al. | |
| 8,909,058 B2 | 12/2014 | Sheu | |
| 8,936,403 B2 | 1/2015 | Howard et al. | |
| 8,961,034 B2 | 2/2015 | Li | |
| 9,112,330 B2 | 8/2015 | Gronenborn | |
| 9,213,148 B2 | 12/2015 | Li | |
| 9,285,544 B2 | 3/2016 | Panotopoulos et al. | |
| 9,297,972 B2 | 3/2016 | Logan, Jr. et al. | |
| 9,400,360 B2 | 7/2016 | McColloch | |
| 9,880,366 B2 | 1/2018 | Vallance et al. | |
| 10,241,275 B2 * | 3/2019 | Li | G02B 6/4214 |
| 10,520,680 B2 * | 12/2019 | Li | G02B 6/3838 |
| 2004/0091268 A1 | 5/2004 | Hogan et al. | |
| 2005/0069013 A1 | 3/2005 | Bhandarkar et al. | |
| 2006/0239612 A1 | 10/2006 | De Dobbelaere et al. | |
| 2010/0006784 A1 | 1/2010 | Mack et al. | |
| 2010/0253949 A1 | 10/2010 | Adler et al. | |
| 2010/0278485 A1 | 11/2010 | Nakagawa et al. | |
| 2012/0002284 A1 * | 1/2012 | McColloch | G02B 6/4206 359/558 |
| 2012/0063725 A1 * | 3/2012 | Meadowcroft | G02B 6/4286 385/88 |
| 2013/0044362 A1 | 2/2013 | Commander | |
| 2013/0094807 A1 * | 4/2013 | Shao | G02B 6/4286 385/33 |
| 2013/0148966 A1 | 6/2013 | Kurokawa et al. | |
| 2013/0148969 A1 | 6/2013 | Sheu | |
| 2013/0182996 A1 | 7/2013 | Shastri et al. | |
| 2013/0294732 A1 | 11/2013 | Li | |
| 2013/0322818 A1 | 12/2013 | Li | |
| 2014/0205246 A1 | 7/2014 | Li | |
| 2014/0248057 A1 | 9/2014 | Li et al. | |
| 2015/0050019 A1 | 2/2015 | Sengupta | |
| 2015/0124336 A1 | 5/2015 | Kaufman | |
| 2015/0338585 A1 | 11/2015 | Li | |
| 2015/0355420 A1 | 12/2015 | Li | |
| 2016/0016218 A1 | 1/2016 | Li | |
| 2016/0161686 A1 | 6/2016 | Li | |
| 2016/0320568 A1 | 11/2016 | Haase et al. | |
| 2018/0128992 A1 * | 5/2018 | Li | G02B 6/3874 |

OTHER PUBLICATIONS

Epitaux et al., "Silicon Optical Benches for Next Generation Optical Packaging: Going Vertical or Horizontal", 2005 55th Electronics Components & Technology Conference, vol. 2, Jan. 1, 2005, pp. 1339-1342.

Beranek et al., "Hermetically Sealed Fiber-Optic Transmitter Based on Silicon Micro-Optical Bench Optical Subassembly & Multilayer Thick Film Interconnect", Proceedings of SPIE—The International Society for Optical Engineering 1999, Society of Photo-Optical Instrumentation Engineers, vol. 3906, 1999, pp. 468-473.

International Search Report of Counterpart PCT International Application No. PCT/US2016/046936.

* cited by examiner

HERMETIC OPTICAL SUBASSEMBLY

PRIORITY CLAIM

This application is a continuation of U.S. patent application Ser. No. 15/880,462 filed on Jan. 25, 2018, which is a continuation of U.S. patent application Ser. No. 15/333,184 filed on Oct. 24, 2016, now U.S. Pat. No. 9,880,366, which:
(1) claims the priority of U.S. Provisional Patent Application No. 62/245,878 filed on Oct. 23, 2015;
(2) is a continuation-in-part of U.S. patent application Ser. No. 15/236,390 filed on Aug. 12, 2016, now U.S. Pat. No. 9,864,145; and
(3) is a continuation-in-part of U.S. patent application Ser. No. 15/077,816 filed on Mar. 22, 2016.

These applications are fully incorporated by reference as if fully set forth herein. All publications noted below are fully incorporated by reference as if fully set forth herein.

BACKGROUND OF THE INVENTION

1. Field of the Invention

The present invention relates to optical subassemblies, particularly to hermetically sealed optical subassemblies.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. The data communication systems involve devices that couple fibers in an end-to-end relationship, including optoelectronic or photonic devices that include optical and electronic components that source, detect and/or control light, converting between light signals and electrical signals, to achieve high speed and high capacity data communication capabilities.

In an optical communication system, components on the transmission side are typically packaged in a transmitter optical subassembly (TOSA), and components on the receiving side are typically packaged in a receiver optical subassembly (ROSA). For bidirectional signal transmission along a single optical fiber, components are packaged in a bidirectional optical subassembly (BOSA).

Heretofore, the TOSA consists of a laser diode (e.g., a distributed feedback (DFB) laser), optical interface, monitor photodiode, metal and/or plastic housing, and electrical interface. Depending upon the required functionality and application, other components may be present as well including filter elements and isolators. It is used to convert an electrical signal into an optical signal that is coupled into an optical fiber. The ROSA consists of a photodiode, optical interface, metal and/or plastic housing, and electrical interface. Depending upon the required functionality and application, other components may be present as well including trans impedance amplifiers. It is used to receive an optical signal from a fiber and convert it back into an electrical signal. A BOSA consists of a TOSA, a ROSA and a WDM filter so that it can use bidirectional technology to support two wavelengths on each optical fiber.

For the TOSA, semiconductor lasers used in fiber optics industry are small, sensitive devices. They are typically a few hundred microns long, with tiny pads for cathode and anode that need wire bonding for electrical connection. It is generally necessary to strictly regulate the operating temperature of the laser in order to stabilize the wavelength of the light; this is typically done using a thermoelectric cooler (TEC). Moreover, to couple the light generated by them into an optical fiber, focusing lenses with tight alignment tolerances are needed. Because of these delicacies, proper packaging is a crucial aspect.

With the TOSA, an optical subassembly fulfills several functions. It provides a stable mechanical platform for the laser chip along with the necessary electrical interconnects. Inside the TOSA, the interconnects are wirebonded to the laser's cathode and anode. Practical TOSAs may include a number of other electronic parts, such as power monitoring diodes, TEC coolers, and external modulators. The laser diode (and any additional device) is mounted on a substrate.

In assembling a TOSA package, the laser is aligned with an optical fiber so as to provide sufficient coupling efficiency. The laser and the optical fiber may also need to be aligned with lenses disposed therebetween. It is often difficult and challenging to align all of the optical components to each other since three-dimensional alignment is typically required. In addition, for a variety of applications, it is desirable to hermetically seal the opto-electronic devices within the housing of the TOSA package, to protect the components from corrosive media, moisture and the like.

Heretofore, in a hermetically sealed package, the opto-electronic components (receiver and/or transmitter and associated optical elements and electronic hardware) are contained in an opto-electronic package. The optical fiber is introduced from outside the housing of the opto-electronic package, through an opening provided in the housing wall. The end of the optical fiber is optically coupled to the opto-electronic components held within the housing. A feedthrough element supports the portion of the optical fiber through the wall opening. Since the package of the opto-electronic package must be hermetically sealed as whole, the feedthrough element must be hermetically sealed, so that the electro-optic components within the opto-electronic package housing are reliably and continuously protected from the environment.

Heretofore, hermetic feedthrough is in the form of a cylindrical opening in the package housing defining a relatively large clearance through which a section of the optical fiber passes. A sealing material such as glass frit or metal solder is applied to seal the clearance space between the optical fiber and the housing. Given the large clearance between the housing and the optical fiber and the use of sealant material and its clearance (i.e., a layer of material between the external fiber wall and the inside wall of the housing), the housing does not support the optical fiber with precise positional alignment with respect to the components inside housing. The end of the optical fiber is required to be positioned by a ferrule or other alignment feature that is optically aligned with the opto-electronic components provided in the package. To optically couple the input/output of the optical fiber to the opto-electronic components in the package, optical elements such as lenses and mirrors are required to collimate and/or focus light from a light source (e.g., a laser) into the input end of the optical fiber (or to collimate and/or focus light from the output end of the optical fiber to the receiver). To achieve acceptable signal levels, the end of the optical fiber must be precisely aligned at high tolerance to the transmitters and receivers, so the optical fiber is precisely aligned to the optical elements supported with respect to the transmitters and/or receivers.

It can be appreciated that for a TOSA, the connection and optical alignment of the optical fiber with respect to a transmitter must be assembled and the components must be fabricated with sub-micron precision. In the past, it has been challenging for TOSAs to be economical produced in a fully automated, high-speed process. Similar challenges apply to ROSA and BOSA.

U.S. Patent Application Publication No. US2016/0274318A1, commonly assigned to the assignee of the present invention, discloses an optical bench subassembly including an integrated photonic device. Optical alignment of the photonic device with the optical bench can be performed outside of an optoelectronic package assembly before attaching thereto. The photonic device is attached to a base of the optical bench, with its optical input/output in optical alignment with the optical output/input of the optical bench. The optical bench supports an array of optical fibers in precise relationship to a structured reflective surface. The photonic device is mounted on a submount to be attached to the optical bench. The photonic device may be actively or passively aligned with the optical bench. After achieving optical alignment, the submount of the photonic device is fixedly attached to the base of the optical bench.

What is needed is an improved hermetic optical subassembly, which reduces package size, and improves manufacturability, throughput, optical alignment tolerance, ease of use, functionality and reliability at reduced costs. The present invention improves on the invention disclosed in U.S. Patent Application Publication No. US2016/0274318A1.

SUMMARY OF THE INVENTION

The present invention provides an improved hermetic optical subassembly structure to facilitate optical alignment of components within the subassembly, which overcomes the drawbacks of the prior art. The present invention provides a hermetic subassembly comprising three main structural components, including a first optical bench that directs optical signals to/from an optical waveguide, a carrier supporting at least one opto-electronic or photonic device (e.g., a laser or a photodiode), and a second, intermediate, optical bench that directs optical signals between the photonic device and the first optical bench. When assembled, the intermediate optical bench aligns the carrier to the first optical bench, such that the photonic device and the waveguide are optically aligned along a desired optical path.

In one embodiment, the first optical bench supports an optical component in the form of an optical wave guide (e.g., an optical fiber). In a more specific embodiment, the body of the first optical bench defines an alignment structure in the form of at least one groove to precisely support the end section of an optical fiber. An optical element (e.g., a lens, a prism, a reflector, a mirror, etc.) is provided in precise relationship to the end face of the optical fiber. In a further embodiment, the optical element comprises a structured reflective surface (e.g., planar reflective, convex reflective, or concave reflective (e.g., an aspherical mirror surface)). The reflective surface is optically aligned with the optical axis of the optical fiber along the desired optical path.

In one embodiment, the photonic device is mounted on the substrate of the carrier. In one embodiment, the photonic device comprises at least one edge emitting laser (EML). A thermos-electric cooler (TEC) is provided between the EML and the carrier substrate for cooling the EML. The carrier may be provided with circuits, electrical contact pads, circuit components (e.g., a driver for the EML), and other components and/or circuits associated with the operation of the photonic device.

The intermediate optical bench includes a structured reflective surface (e.g., planar reflective, convex reflective, or concave reflective (e.g., an aspherical mirror surface)) that directs optical signals between the carrier and the first optical bench. A planar surface of the intermediate optical bench is attached to the first optical bench with the reflective surfaces optically aligned to each other along the desired optical path. The body of the intermediate optical bench is attached to the carrier with the reflective surface optically aligned with the photonic device (i.e., its optical axis) along the desired optical path.

Accordingly, after assembly, optical signals can be directed between the photonic device and the waveguide via the reflective surface of the first optical bench and the reflective surface of the intermediate optical bench.

The reflective surface of the first optical bench may be passively aligned with the reflective surface of the intermediate optical bench (e.g., relying on alignment surface features and/or indicia provided on first optical bench and/or the intermediate optical bench. In addition, the photonic device may be passively aligned to the reflective surface of the intermediate optical bench. Alternatively, the photonic device and the optical bench may be actively aligned by passing an optical signal between the reflective surface in the intermediate optical bench and the photonic device. The photonic device can be activated to allow for active alignment. After achieving optical alignment, the carrier of the photonic device is fixedly attached to the body of the intermediate optical bench. The optical benches and the carrier are structured to be hermetically sealed against each other to form a hermetic package.

The body of the first and second optical benches are preferably formed by stamping a malleable stock material (e.g., a metal stock), to form precise geometries and features of the optical benches (including reflective surfaces, optical fiber alignment grooves, etc.). By using a stamped single-solid-body for each of the benches, the optical components that are not stamped (e.g., fibers, ball lens) can be aligned passively using alignment features defined within the stamped benches. The stamped optical bench will minimize the number of components that need to be actively aligned, reducing production costs and increasing yield and throughput.

In another embodiment of the present invention, the optical bench is structured to support multiple waveguides (e.g., multiple optical fiber), and structured reflective surfaces (e.g., an array of mirrors), to work with an array of photonic devices mounted on a carrier.

In a further aspect of the present invention, the hermetic optical subassembly of the present invention integrates multiplexers/demultiplexers (Mux/Demux), for directing optical signals between a single optical fiber and a plurality of photonic devices.

In Summary, the present invention provides a hermetic optical subassembly, comprising: a first optical bench supporting an optical fiber, and comprising at least one first mirror defined by stamping a first malleable metal stock material; a second optical bench comprising at least one second mirror defined by stamping a second malleable metal stock material; a carrier supporting at least one photonic device, wherein the optical fiber, the first mirror, the second mirror and the photonic device are in optical alignment, and the first mirror and the second mirror directs an optical signal between the photonic device and the optical fiber, and wherein the first optical bench, the second optical bench and the carrier are coupled to form a hermetic package. Further, the present invention provides wherein the first optical bench further comprising a multiplexer that combines a plurality of input optical signals each having a different wavelength into a single output optical signal to be directed to the optical fiber, wherein the photonic device comprises a plurality of transmitters each providing an optical signal of a different wavelength, wherein the first optical bench comprises a plurality of first mirrors and the second optical bench comprises a plurality of second mirrors corresponding to the plurality of first mirrors and corresponding to the plurality of transmitters, and wherein corresponding transmitter, first mirror and second mirror are in optical alignment, and corresponding first mirror and corresponding second mirror directs corresponding optical signal provided by corresponding transmitter to the multiplex. The multiplexer comprises a filter block supported on the first optical bench, wherein the filter block combines the optical signals provided by the respective transmitters into the single output signal to be directed at the optical fiber.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 1A:
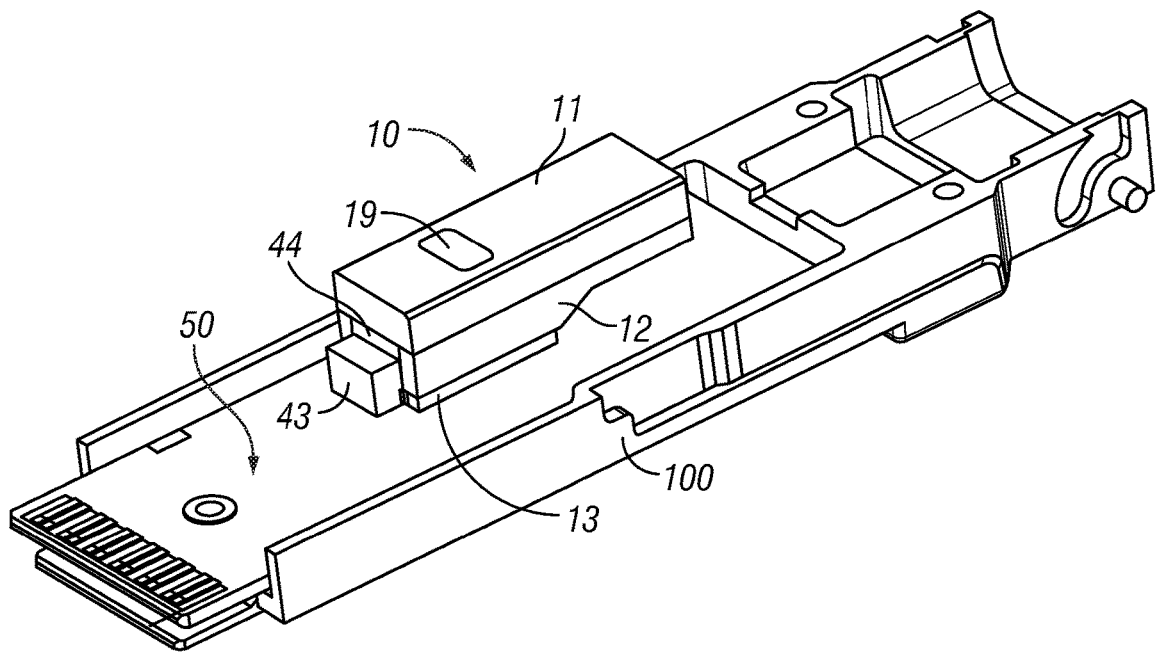
FIG. 1A is a perspective diagram of a quad small-form-factor pluggable (QSFP) transceiver module incorporating a hermetic optical subassembly, in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved hermetic optical subassembly structure to facilitate optical alignment of components within the subassembly, which overcomes the drawbacks of the prior art. The present invention provides a hermetic subassembly comprising three main structural components, including a first optical bench that directs optical signals to/from an optical waveguide, a carrier supporting an opto-electronic or photonic device (e.g., a laser or a photodiode), and a second, intermediate, optical bench that directs optical signals between the photonic device and the first optical bench. When assembled, the intermediate optical bench aligns the carrier to the first optical bench, such that the photonic device and the waveguide are optically aligned along a desired optical path.

Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee.

For example, U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which defined on a metal base is a structured surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a stock material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment features, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the stock material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

U.S. Pat. No. 8,961,034 discloses a method of producing a ferrule for supporting an optical fiber in an optical fiber connector, comprising stamping a metal blank to form a body having a plurality of generally U-shaped longitudinal open grooves each having a longitudinal opening provided on a surface of the body, wherein each groove is sized to securely retain an optical fiber in the groove by clamping the optical fiber. The optical fiber is securely retained in the body of the ferrule without the need for additional fiber retaining means.

International Patent Application No. PCT/US2016/046936 (PCT Publication No. WO/2017/027864) discloses a multiplexer/demultiplexer (Mux/Demux) subassembly includes a stamped optical bench, which includes an array of stamped reflective surfaces for redirecting optical signals. Alignment features and components of the Mux/Demux subassembly are integrally formed on a stamped optical bench, defining a desired optical path with optical alignment at tight tolerances. The optical bench is formed by stamping a malleable stock material (e.g., a metal stock), to form precise geometries and features of the optical bench.

The above inventive concepts are incorporated by reference herein, and will be referred below to facilitate disclosure of the present invention. The present invention is disclosed in connection with exemplary embodiments of hermetic transmitter optical subassemblies (TOSA's), which include Mux/Demux. It is understood that the present invention may be adapted to hermetic optical subassemblies for other applications (e.g., ROSA, BOSA), with or without Mux/Demux.

Figure 1B:
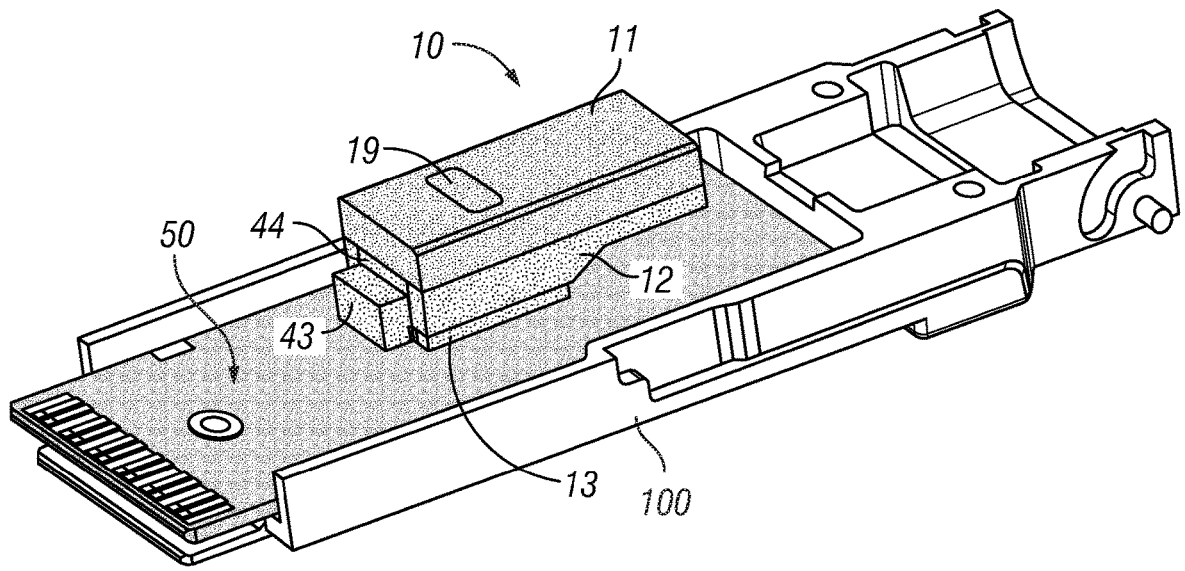
FIG. 1B is another view of FIG. 1A with shading.

FIG. 1A is a perspective diagram of a quad small-form-factor pluggable (QSFP) module 100 incorporating a hermetic optical subassembly 10, in accordance with one embodiment of the present invention; FIG. 1B is another view of FIG. 1A with shading. The QSFP is a full-duplex optical transceiver module with four independent transmit and receive channels. It is designed to replace four single-channel small-form-factor pluggable (SFP) and in a package only about 30% larger than the standard SFP. To equip a QSFP and similar transceivers requiring multiple wavelengths, a small Mux and/or DeMux device is very important. The hermetic optical subassembly 10 of the present invention provides a small footprint, broad operating wavelength range, enhanced impact performance, lower cost, and easier manufacturing process.

Figure 2A:
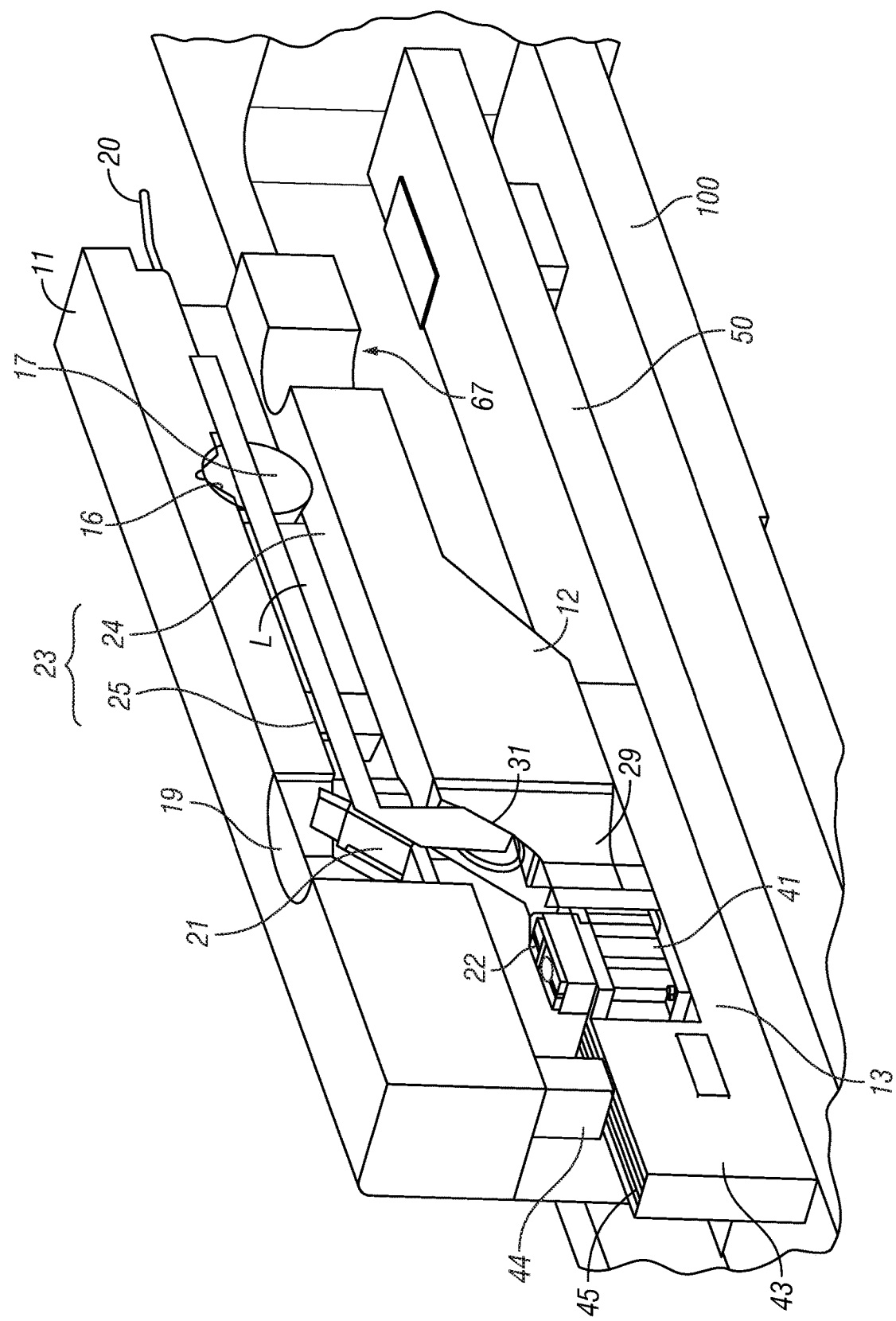
FIG. 2A is a sectional view of the hermetic optical subassembly of FIG. 1.
Figure 2B:
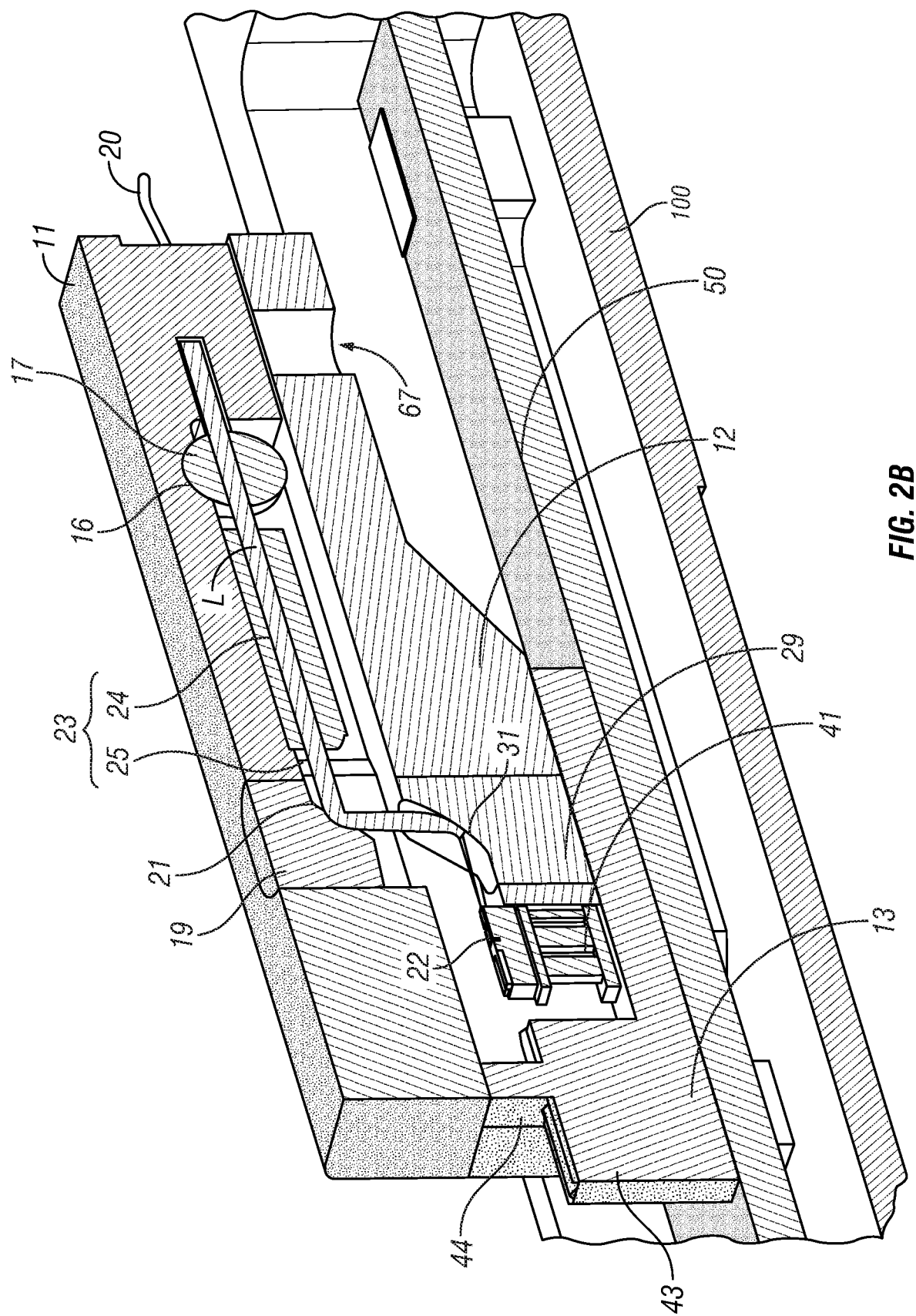
FIG. 2B is another view of FIG. 2A with shading.

FIG. 2A is a sectional view of the hermetic optical subassembly of FIG. 1, FIG. 2B is another view of FIG. 2A with shading. These sectional views illustrate the optical path defined by the hermetic optical subassembly 10. Specifically, in the illustrated embodiment, the hermetic optical subassembly is a TOSA.

The hermetic optical subassembly 10 includes three main structural components, including a first optical bench 11 that directs optical signals to/from an optical waveguide (e.g., an optical fiber 20), a carrier 13 supporting at least one photonic device 22 (e.g., an electrically modulated, edge-emitting laser (EML)), and a second, intermediate, optical bench 12 that directs optical signals between the photonic device 22 and the optical bench 11. When assembled, the intermediate optical bench 12 aligns the carrier 13 to the optical bench 11, such that the photonic device 22 and the optical fiber 20 are optically aligned along a desired optical path L. Specifically, optical signal from the photonic device 22 is reshaped and turned (redirected) by the micro mirror 31 on the intermediate optical bench 12 towards the micro mirror 21 on the optical bench 11, which in turn reshape and/or redirect the optical signal towards the optical fiber 20 (though a ball lens 17).

Figure 3A:
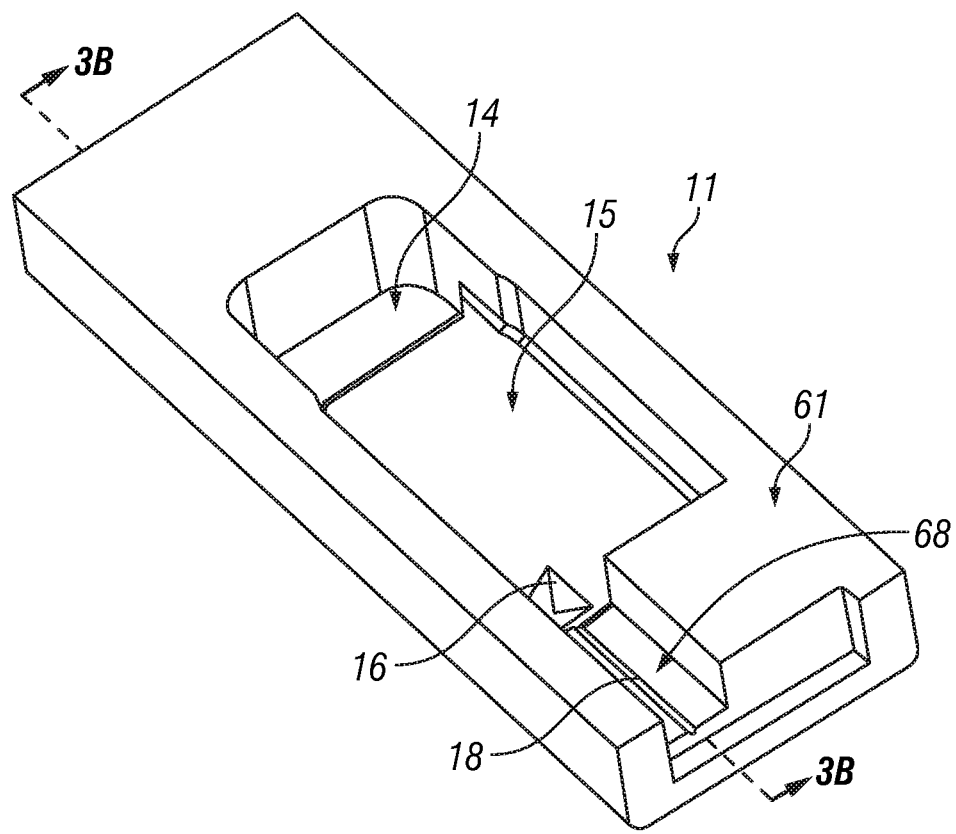
FIGS. 3A to 3E illustrate the structure of the first optical bench in the hermetic optical subassembly, in accordance with one embodiment of the present invention.
Figure 3B:
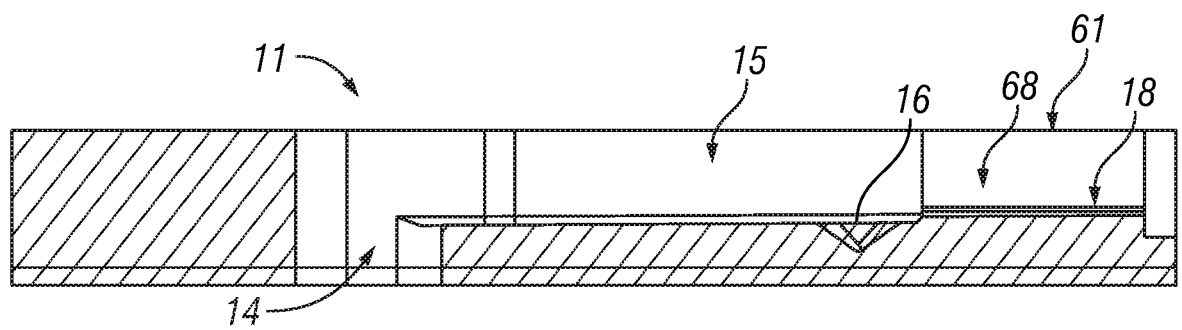
Figure 3C:
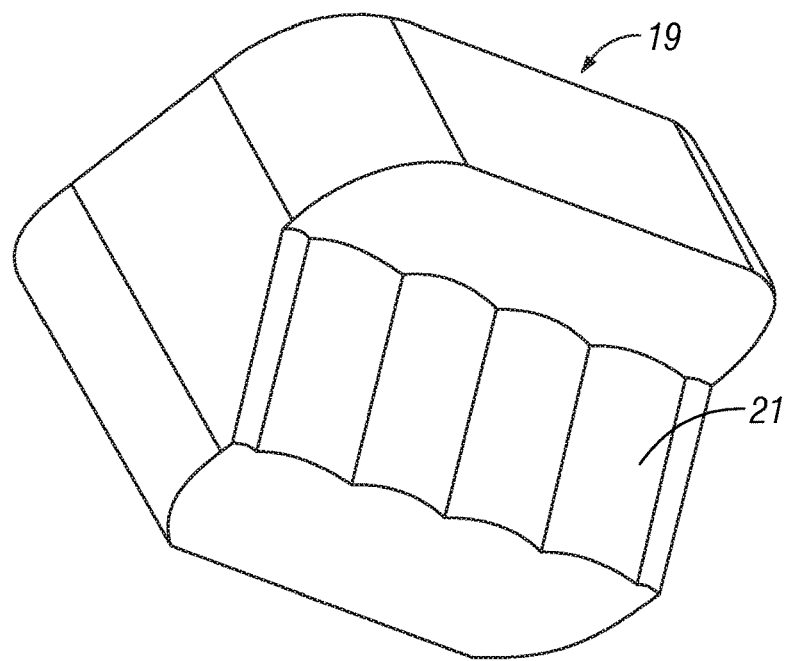

FIGS. 3A to 3E illustrate the structure of the optical bench 11 in the hermetic optical subassembly 10, in accordance with one embodiment of the present invention. FIG. 3A shows the structure of the optical bench 11 without the reflective surfaces 21 (shown in FIG. 3C) and the components for the Mux/Demux (e.g., filter block with thin-film filters and a reflective film; see discussions below in connection with FIG. 3E). FIG. 3B is a section view taken alone line 3B-3B in FIG. 3A. The optical bench 11 serves as a "cover" for the overall hermetic optical subassembly 10. Defined on the body of the optical bench 11 are a through opening 14 adjacent a recess 15, a dimple 16 (e.g., a spherical or tetrahedral depression) to support a ball lens 17 (see FIG. 3D), and a groove 18 in a cavity 68 for aligning the optical fiber 20 (see FIG. 3D). FIG. 3C illustrates a block 19 in the shape of a plug or rivet, which is provided with a plurality of micro mirrors or structured reflective surfaces 21. In this particular illustrated embodiment, there are four micro mirrors 21 corresponding to four EML's (see FIGS. 3E, 5A and 5B). The geometry of the micro mirrors 21 may conform to planar reflective, convex reflective, or concave reflective (e.g., an aspherical mirror surface). For example, in the illustrated embodiment, the micro mirrors 21 may be generally aspherical convex. The block 19 fits into the opening 14 in the body of the optical bench 11 (as will be explained later, the shape of the block 19 is formed in place in the optical bench 11 by a stamping operation, instead of it being separately formed and inserted into the opening 14).

Figure 3D:
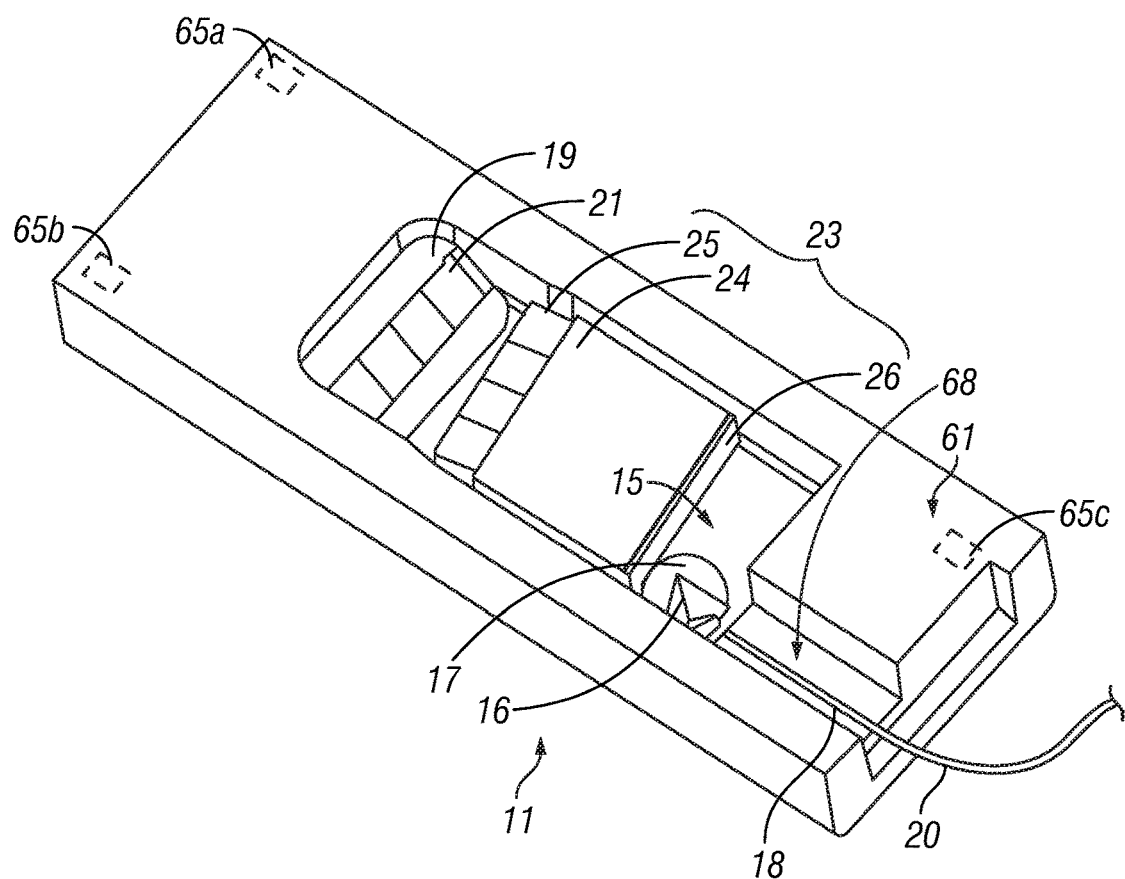
Figure 3E:
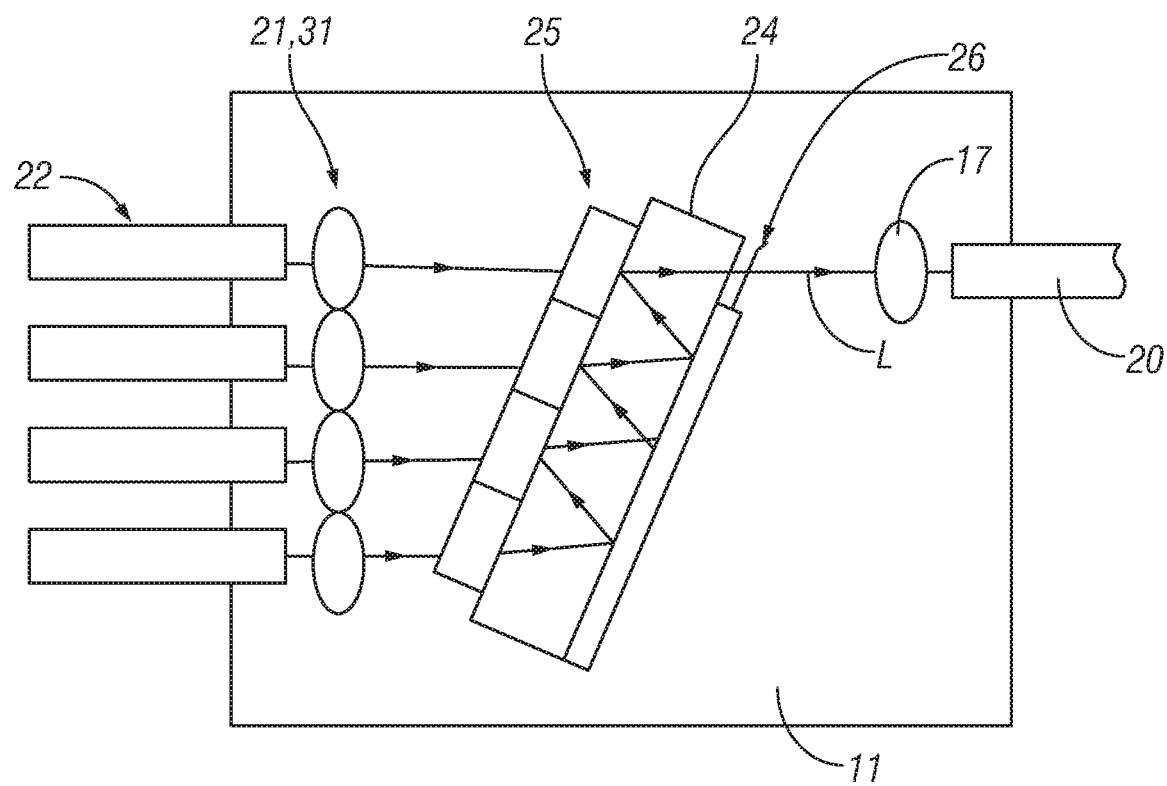

Referring to FIG. 3D, the optical bench 11 is complete with the micro mirrors 21, and the components for the Mux/Demux (actually in this embodiment of TOSA, it is a Mux 23). Referring also to FIG. 3E, the components and optical paths in the Mux 23 is schematically illustrated, in accordance with one embodiment of the present invention. In the illustrated embodiment, the Mux 23 is configured for input signals of four different wavelengths to be combined (i.e., multiplexed) into a single output signal (in reverse, a single input signal can be split (demultiplexed) into four output signals of different wavelengths). The Mux 23 includes a transparent block 24 having an array of thin film filters 25 (there are four filters 25 in this embodiment, each having a particular transmissive wavelength to allow optical signal from respective EML 22 of the respective wavelength to pass through) and a mirror 26 (e.g., a reflective coating) provided on opposing surfaces. The Mux 23 is supported in the recess 15 in the body of the optical bench 11, between the micro mirrors 21 and the ball lens 17 and optical fiber 20, with each micro mirror 21 positioned corresponding to a thin film filter 25.

In a multiplexing operation, optical signals reflected from the micro mirrors 21 (which originated from the outputs of the EML's 22 via micro mirror 31) are passed through the respective filters 25, and the signals are reflected within the transparent block 24 between the thin film filters 25 and the mirror 26, with the thin film filters reflecting all signals that do not correspond to the respective the transmission wavelengths. As a result, the optical signals are effectively combined into a single output signal to the optical fiber 20. The ball lens 17 focus this output signal onto the end face of the optical fiber to improve optical coupling. The particular illustrated optical paths in FIG. 3E were configured in prior art systems, except that none of those systems incorporates the type of optical subassembly in accordance with the present invention. As shown, the "desired optical path L" would include various input optical paths from the EML'ss 22. (In a demultiplexer operation, the optical paths are in reverse.)

In accordance with one embodiment of the present invention, the array of micro mirrors 21, and some or all of the alignment features for the optical fiber 20, the ball lens 17, and the components of the Mux 23 may be integrally formed on the body of the optical bench 11 by stamping, so as to define the desired optical path, with optical alignment at tight tolerances. These features may be integrally formed in a single stamping operation, after the body of the optical bench 11 is first provided with the recess 15, opening 14 and cavity 68 (e.g., from an earlier stamping operation) as shown in FIG. 3A.

In the illustrated embodiment, the stamped optical bench 11 supports the filter block 24 (having the thin film filters 25 and mirror 26), the lens 17, and the optical fiber 20. The body of the optical bench 11 defines an alignment structure in the form of the groove 18 to precisely support the end section of the optical fiber 20. The body of the optical bench 11 also defines the slot 16 (e.g., a spherical or tetrahedral depression) to support the ball lens 17 (or a reflector, a mirror, etc.) in precise relationship to the end face of the optical fiber 20, and further an additional alignment feature (e.g., a step in the recess 15, not shown) for accurately, and passively, aligning the filter block 14 along the desired optical path. The optical element comprising the array of structured reflective surfaces (e.g., micro mirrors 21, which may be planar reflective or concave reflective (e.g., an aspherical mirror surface)) is stamped formed with the appropriate geometries for routing optical signals along the desired optical path L.

As shown in FIG. 3C, the block 19 having the micro mirrors 21 is shown alone after stamp forming. In actual stamping operation, before the micro mirror features are formed by stamping, a metallic "rivet", e.g., made from a soft material such as aluminum, is inserted into the opening 14 in the body of the optical bench 11. Other surface features on the optical bench 11 may also be formed together after inserting the aluminum rivet into the opening 14 in the body of the optical bench 11. For example, the aluminum rivet is stamped with the desired surface features shown along with some of the other features (e.g., the groove 18 for receiving a section of the optical fiber 20; alignment features 65a to 65c on planar surface 61; see FIG. 3D). This "rivet" type stamping approach and its features and benefits are disclosed in U.S. Patent Application Publication No. US2016/0016218A1, which has been commonly assigned to the Assignee of the present invention. Details of such stamping process is not discussed herein, but incorporated by reference herein.

The aluminum rivet is easily formable by stamping, and it has high reflectance in the wavelength range adopted in telecommunications and data communications. The material of the body of the optical bench 11 may be Kovar. Specifically, in the above described embodiments, pure aluminum is chosen for the rivet for forming the optical bench because it is relatively softer, and more malleable/ductile than Kovar chosen for the body of the optical bench 11, to obtain the desired geometries, dimensions and/or finishes of critical features (e.g., the micro mirrors 21) at the optical bench 11. The harder and stronger frame material (e.g., Kovar) is chosen to form structures that require the integrity of a harder material, but stamping the harder base material would require larger forces and result in more springback, requiring multiple hits of the stamping punch to obtain the desire shape (especially for deeper profiles such as a deep recess), which may result in relatively higher tolerances. In contrast, the relatively softer material chosen for stamping the micro mirrors 21 requires less stamping forces and results in less springback, requiring relatively fewer hits (e.g., just one hit) of the stamping punch to obtain the final stamped part. Hence, micro features such as micro mirrors 21 can be stamped on the optical bench 11 with very tight dimensional tolerances. The harder body material of the optical bench 11 also functions as part of the die, which partially shapes the block 19 to define the micro mirror 21 during stamping operation. The coefficient of thermal expansion for Kovar material also closely matches the coefficient of thermal expansion of most semiconductor and glass materials so that temperature changes induce minimal misalignment between the components. Furthermore, the melting temperatures of the metallic optical bench are sufficiently high to allow for compatibility with soldering processes that are commonly used in electronic and photonic packaging. Optionally, an optical coating may be deposited onto the stamped micro mirrors 21 to increase reflectivity.

While the above embodiment makes use of a ball lens 17 to focus output light from the Mux 23 to the optical fiber 20, instead of a ball lens 17, a micro mirror (not shown) may be stamped formed on the body of the optical bench 11, to focus output optical signal from the Mux 23 to the optical fiber 20.

If at least the micro mirrors 21 and the fiber alignment groove 18 are stamped in a single stroke by the same tool when forming the optical bench 11, the alignment precision between the optical fiber 20 and the array of micro mirrors 21 could be on the order of 200 nanometers. This provides completely passive alignment sufficient for single-mode optics, thus avoiding the tedious and more complex active alignment practice in the prior art. If the other alignment features for the ball lens 17 and the filter block 24 are also integrally stamped in a single step along with the micro mirrors 21 and the fiber alignment groove 2, further accurate passive alignment of these components are also possible.

An alternate embodiment of a Mux (and Demux) optical bench subassembly is disclosed in International Patent Application No. PCT/US2016/046936 (PCT Publication No. WO/2017/027864), which may be adapted and replace the optical bench 11 in the hermetic optical subassembly of the present invention.

In view of the above disclosure, it can be seen that the stamped optical Mux subassembly in accordance with the present invention uses a stamped optical alignment platform that uses non-stamped thin-film filters to combine multiple sources of different wavelengths (via a stamped reflector) into a single beam and inject it into an optical fiber. By using stamped micro mirror arrays in combination with thin-film bandpass filters as part of the optical system to do the optical signal splitting/combining, the mirrors and the alignment optical bench will be a stamped single-solid-body, and all of the optical components that are not stamped (fibers, thin film filters, possible ball lenses) can be aligned passively using features defined within the stamped optical bench. The stamped optical bench will minimize the number of components that need to be actively aligned, reducing production costs and increasing yield and throughput.

A Mux/Demux having a stamped optical bench could have similar or smaller overall size and configuration, and similar or smaller footprint, compared to a prior art Mux/Demux using, e.g., a silicon optical bench. Stamped optical benches could be configured to have a smaller footprint and overall size than silicon optical benches. A stamped optical bench can effectively simplify the configuration of a silicon optical bench without compromising the desired defined optical path.

The Mux/Demux subassembly on the optical bench 11 discussed above is suited for single-mode, or multi-mode, and the sources may be fibers, or grating couplers, or VCSEL's, or DFB lasers. The receiver for the light output may be any kind of light sensitive detector, or any kind of fiber, or grating couplers, or any kind of waveguide. The Mux/Demux may involve coarse wavelength division multiplexing (CWDM) or dense wavelength division multiplexing (DWDM), and involve any number of wavelengths or channels, beyond the four channels illustrated in the embodiments.

Figure 4A:
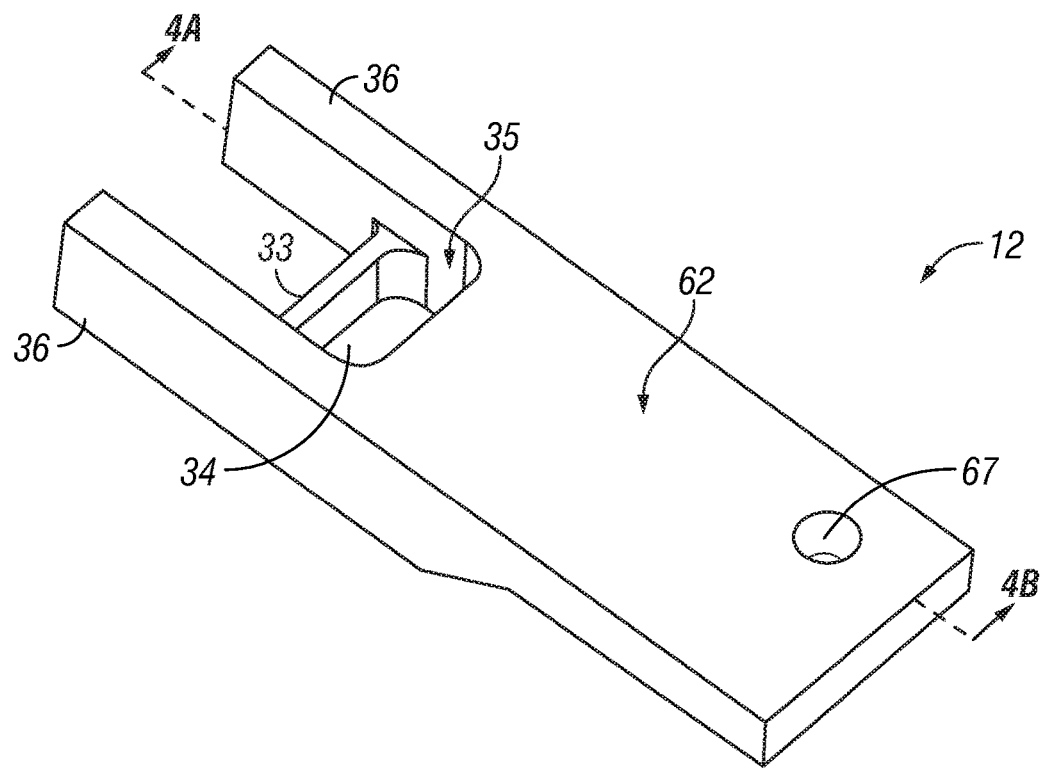
FIGS. 4A to 4D illustrate the structure of the second, intermediate, optical bench in the hermetic optical subassembly, in accordance with one embodiment of the present invention.
Figure 4B:
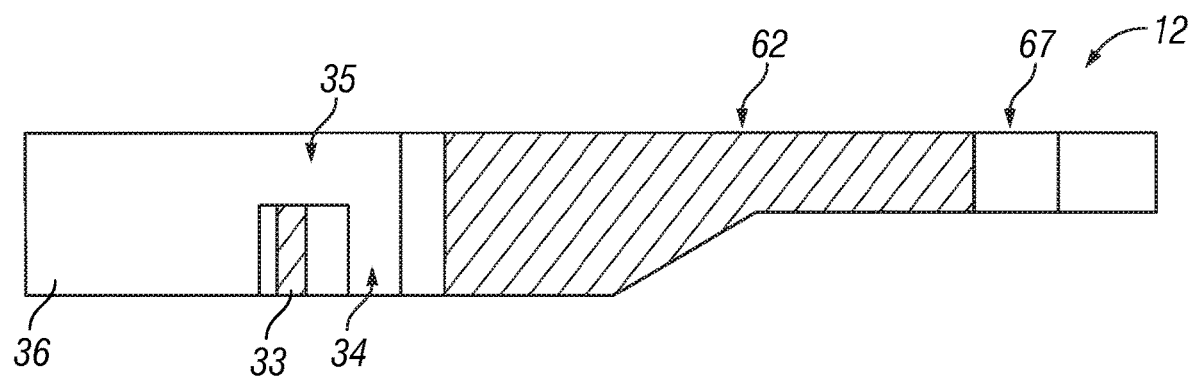

FIGS. 4A to 4D illustrate the structure of the second, intermediate, optical bench 12 in the hermetic optical subassembly 10, in accordance with one embodiment of the present invention. FIG. 4A shows the structure of the optical bench 12 without the micro mirrors 21 (shown in FIG. 4C). FIG. 4B is a section view taken alone line 4B-4B in FIG. 4A. The optical bench 12 serves as an intermediate adaptor to couple (as will be further discussed below, hermetically couple) the carrier 13 having the photonic devices and the optical bench 11 to form the overall hermetic optical subassembly 10. Defined on the body of the optical bench 12 is a through opening 34 in a recess 35 adjacent two prongs 36. The through hole is flanked by the main body of the optical bench 12, and a cross-member 33 between the prongs 36. A small through-hole 67 is provided at a corner of the planar surface 62, at a location matching the location of the cavity 68 in the optical bench 11, for inserting hermetic sealing material to seal the optical fiber section (as will be explained later below).

Figure 4C:
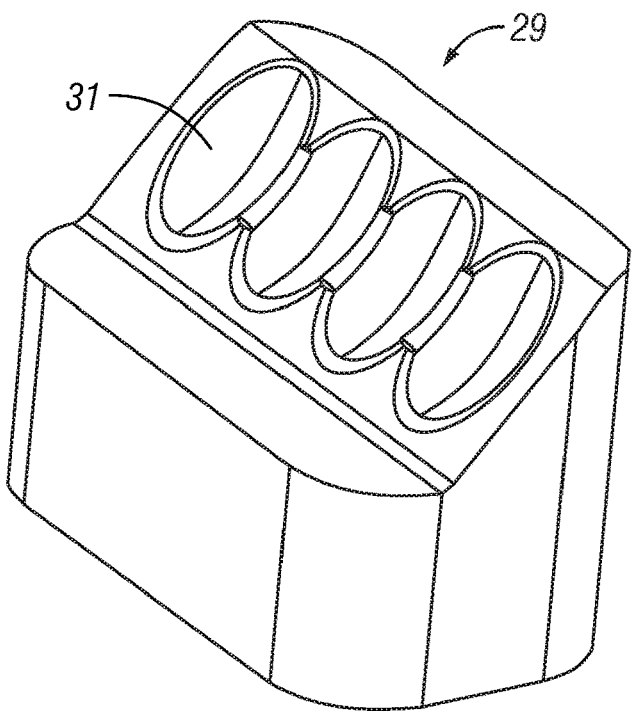

FIG. 4C illustrates a block 29 in the shape of a plug or rivet, which is provided with a plurality of micro mirrors or structured micro mirrors 31. In this particular illustrated embodiment, there are four micro mirrors 31 corresponding to the four EML's (see FIGS. 3E, 5A and 5B). The geometry of the micro mirrors 31 may conform to planar reflective, convex reflective, or concave reflective (e.g., an aspherical mirror surface). For example, in the illustrated embodiment, the micro mirrors 31 may be generally aspherical concave. Referring also to FIG. 5B, the output of the EML 22 does not cast a round beam spot, but instead an oval beam spot with fast and slow axes. Accordingly, the micro mirrors 21 and 31 have geometry that reshapes the oval beam into a round beam and turn the beam towards the filter 24 in the cover optical bench 11. The block 29 fits into the opening 34 in the body of the optical bench 12 (as will be explained later, and similar to the block 19 in the optical bench 11, the shape of the block 29 is formed in place in the optical bench 12 by a stamping operation, instead of it being separately formed and inserted into the opening 34).

Figure 4D:
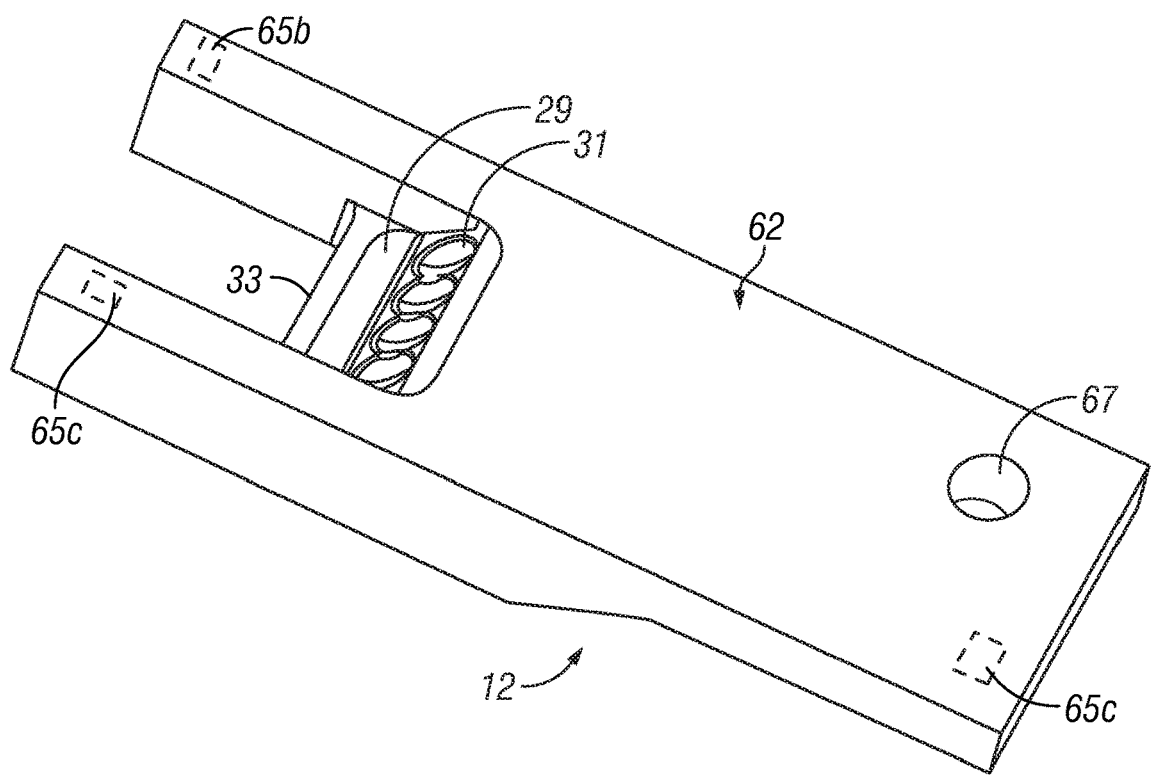

Referring to FIG. 4D, the optical bench 12 is complete with the micro mirrors 31. In accordance with one embodiment of the present invention, the array of micro mirrors 31, and passive alignment features (e.g., alignment indicia and windows, protrusions and/or recesses, schematically represented by dotted squares 65a to 65c in FIGS. 3D and 4D) complementarily provided on the facing planar surfaces 61 and 62 for passively aligning the optical benches 11 and 12, may be integrally formed on the body of the optical bench 12 by stamping, so as to define the desired optical path, with optical alignment at tight tolerances. These features may be integrally formed in a single stamping operation, after the body of the optical bench 12 is first provided with the prongs 36, the recess 35, the opening 34 and the opening 67 (e.g., from an earlier stamping operation) as shown in FIG. 4A.

As shown in FIG. 4C, the block 29 having the micro mirrors 31 is shown alone after stamp forming. In actual stamping operation, before the micro mirror features are formed by stamping, a metallic "rivet", e.g., made from a soft material such as aluminum, is inserted into the opening 34 in the body of the optical bench 12 (which could be made of Kovar). Other surface features on the optical bench 12 may also be formed together after inserting the aluminum rivet into the opening 34 in the body of the optical bench 12. For example, the aluminum rivet is stamped with the desired surface features shown along with some of the other features (e.g., passive alignment features 65 for aligning with the optical bench 11). Optionally, an optical coating may be deposited onto the stamped micro mirrors 31 to increase reflectivity.

This "rivet" type stamping approach and its features and benefits are disclosed in U.S. Patent Application Publication No. US2016/0016218A1, which has been commonly assigned to the Assignee of the present invention. Details of such stamping process is not discussed herein, but incorporated by reference herein. The design considerations using this approach is similar to those in connection with stamp forming the optical bench 11, and they will not be repeated here.

Figure 5A:
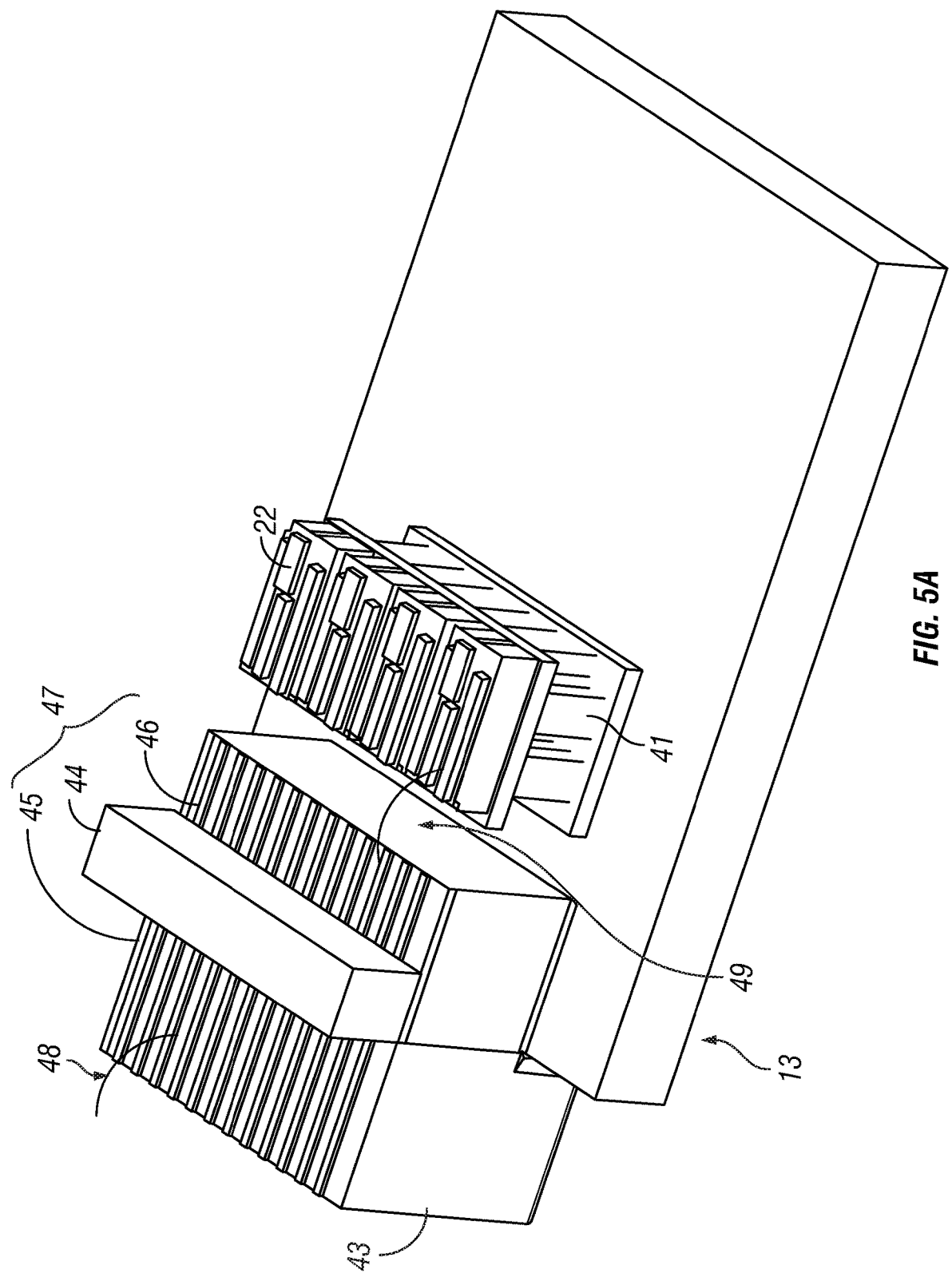
FIGS. 5A and 5B illustrate the structure of the carrier including the photonic devices, in accordance with one embodiment of the present invention.
Figure 5B:
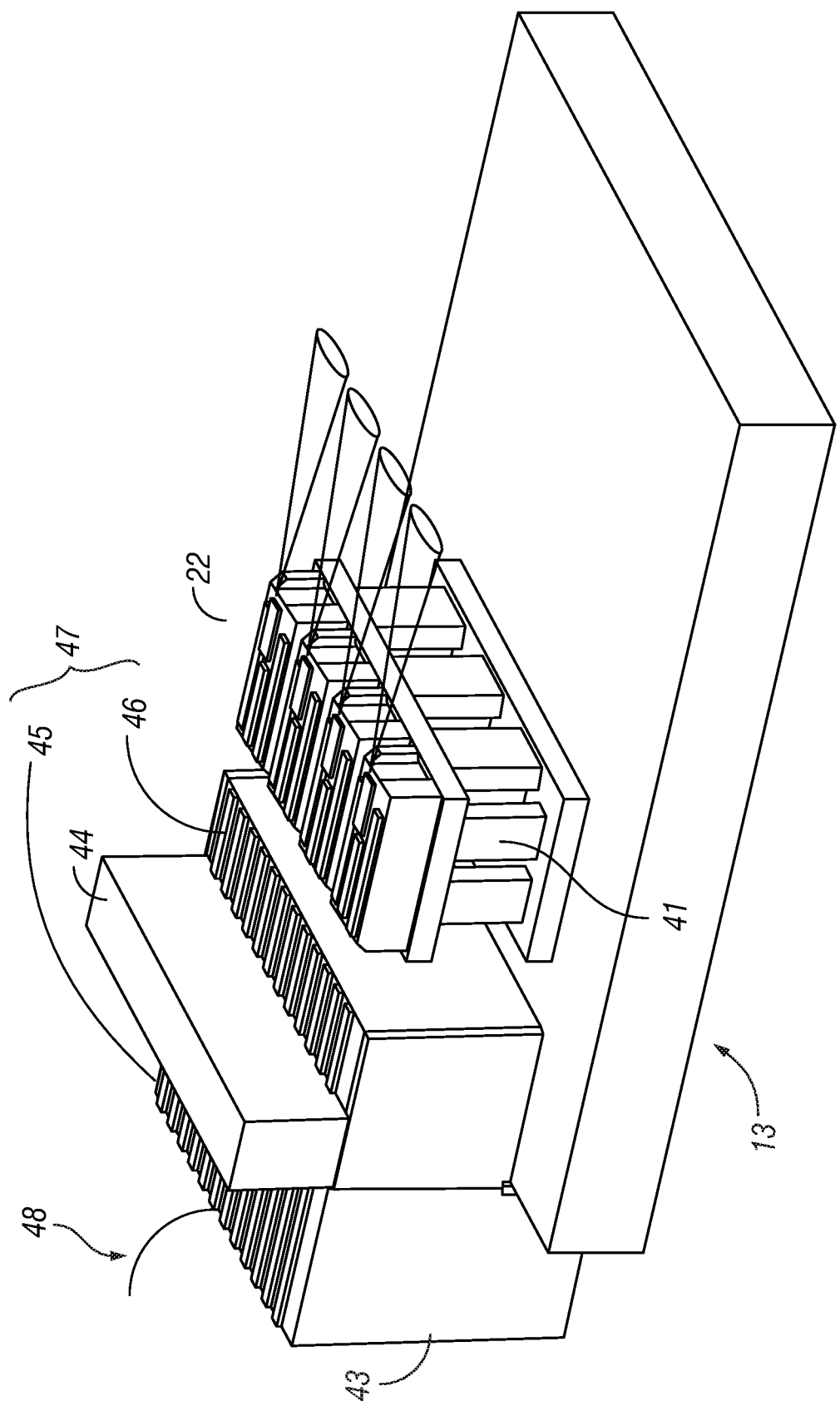

FIGS. 5A and 5B illustrate the structure of the carrier 13 including the photonic device 22, in accordance with one embodiment of the present invention. The carrier 13 serves as a "base" of the overall hermetic optical subassembly 10, for mounting the hermetic optical subassembly 10 onto, e.g., a standard "QFSP28" board 50 shown in FIG. 1A. The carrier 13 supports a thermoelectric cooler (TEC) 41, on which at least one photonic device is supported (in this embodiment, the photonic device includes four EML's of different wavelengths). Cooling of EML's is essential for proper operation of the EML's. The EML's are mounted on a sub-carrier (e.g., in a chip on carrier (COC) configuration) on top of the TEC 41. The temperature of the carrier and hence the EML's need to be regulated to control the wavelength of the optical signal output of the EML's. The carrier 13 may be provided with circuits, electrical contact pads, circuit components (e.g., drivers for the EML's), and other components and/or circuits associated with the operation of the EML's.

It is noted that preferably, the electrical traces should be coplanar with the lasers to improve signal integrity. As can be seen from FIGS. 1A, 2A, 6A and 6C, the carrier 13 includes a block 43 having a vertically extending wall 44. Patterned electrical traces 47 are provided through and/or below the wall 44, so that sections 45 and 46 of the traces 47 are exposed beyond both sides of the wall 44. The traces 45 provide for electrical access to the hermetic optical subassembly 10, or wire bonding to other components outside the hermetic optical subassembly 10, and the traces 46 provide for wire bonding to the EML's. The traces are substantially coplanar with the EML's. Given the distal surface of the block 44 and the wall 44 of the carrier 13 are exposed to external environment, the material of the carrier 13 should be chosen to be a hermetic material with the electrical traces 47 running there-through. The carrier 13 may be made of hermetic materials such as Aluminum Nitrite (AlN), high temperature cofired ceramic (HTCC) or low temperature cofired ceramic (LTCC), which are good hermetic packaging material due to its desirable electrical properties, high mechanical strength and good thermal conductivity. These materials are non-electrically conductive or electrically insulating, so as to be able to support the traces 47, as compared to the optical benches 11 and 12, which are made of metal material(s).

With the optical bench 11, the intermediate optical bench 12 and the carrier 13 pre-assembled as respectively shown in FIG. 3D, FIG. 4D and FIG. 5A, the optical bench 11 is first attached to the intermediate optical bench 12. The planar surface 62 (see FIG. 4D) of the intermediate optical bench 12 is mated to the planar surface 61 (see FIG. 3D) of the optical bench 11, so that the reflective surfaces 21 and 31 are optically aligned to each other along the desired optical path L. As noted above, passive alignment of the optical benches 11 and 12 may be achieved by making use of the alignment features 65a to 65b provided on the facing planar surfaces 61 and 62 of the optical benches 11 and 12, respectively. The optical benches 11 and 12 may be fixedly attached by soldering, brazing, or laser welding along the perimeter of the mating surfaces to provide hermetic joints. A hermetic sealing material, such as a glass solder, is inserted into the opening 67 to fill the cavity 68 in the optical bench 11 (see FIGS. 2A and 3D), so as to hermetically seal the feedthrough section of the optical fiber 20. Hermetic sealing may further be based on the teaching of U.S. Patent Application Publication No. US2013/0294732A1. After hermetically assembling the first and second optical benches 11 and 12 and the carrier together, a hermetic package is formed.

After assembling the optical benches 11 and 12, the preassembled carrier 13 shown in FIG. 5A is aligned and attached to the front of and below the intermediate optical bench 12. The adjoining mating surfaces are hermetically sealed, e.g., by soldering. The photonic device 22 may be passively aligned to the reflective surfaces 31 of the intermediate optical bench 12 (e.g., by providing additional passive alignment surface features on the mating surfaces of the carrier 13 and the optical bench 12 (not shown). Alternatively, the photonic device 22 and the intermediate optical bench 12 may be actively aligned by passing an optical signal between the reflective surfaces 31 in the intermediate optical bench 12 and the photonic device 22. The photonic device 22 can be activated to allow for active alignment. After achieving optical alignment, the carrier 13 having the photonic device 22 is fixedly attached to the base of the intermediate optical bench. The optical benches and the carrier are structured to be hermetically sealed against each other. The resultant structure of the hermetic optical subassembly would include a 3-tier structure, including the top optical bench 11, the intermediate optical bench 12 and the bottom carrier 13.

Figure 6A:
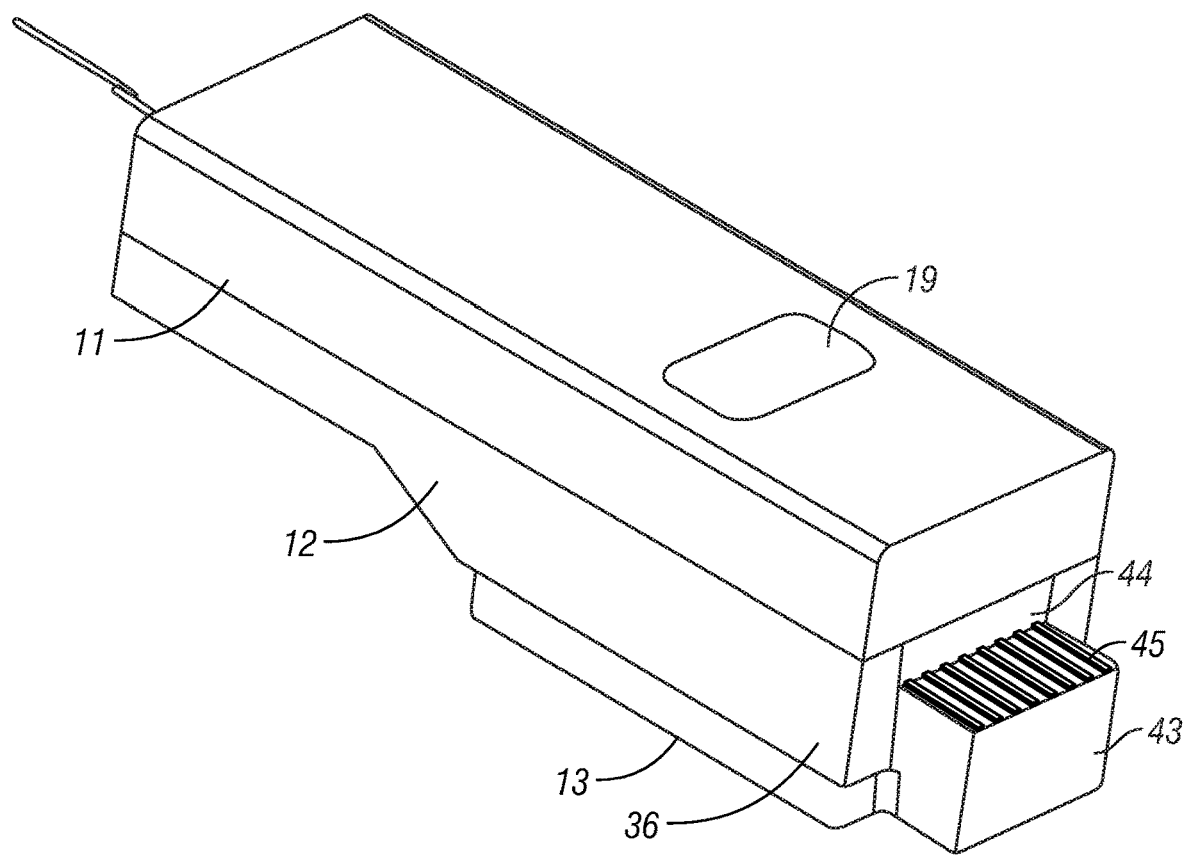
FIGS. 6A to 6C illustrate the hermetic optical subassembly as assembled with its components.
Figure 6B:
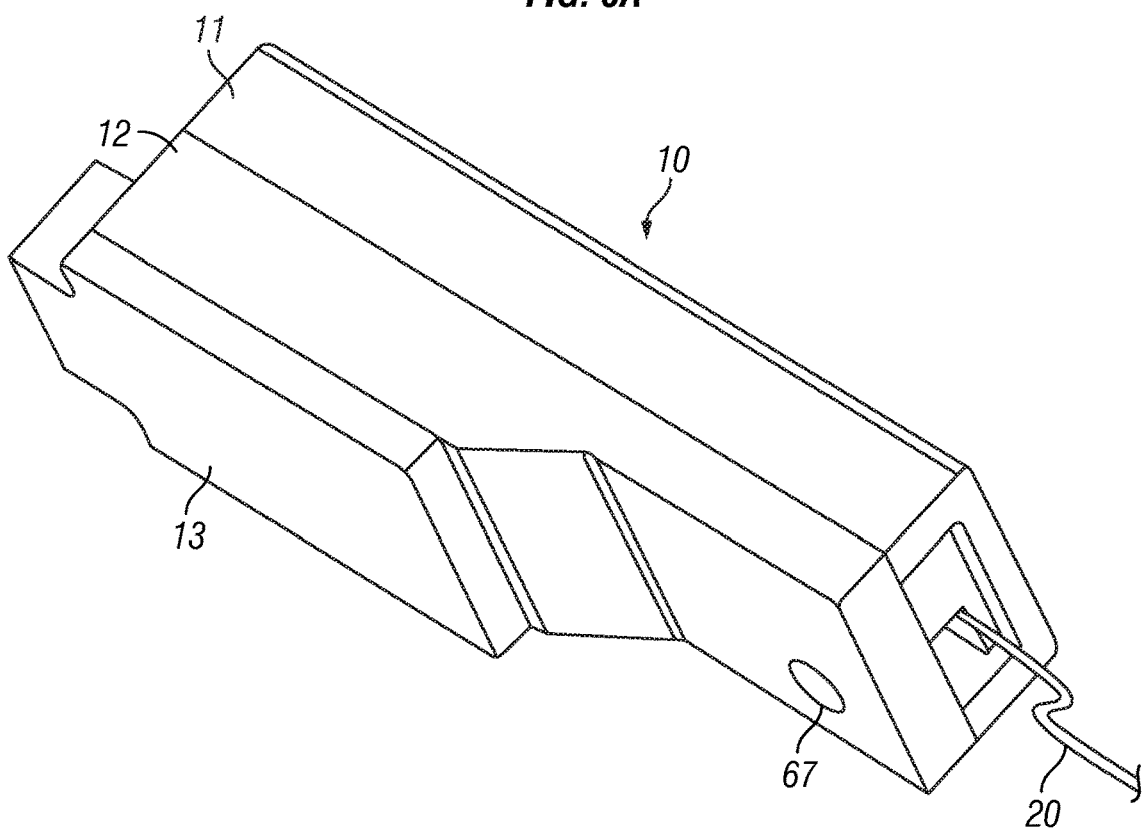
Figure 6C:
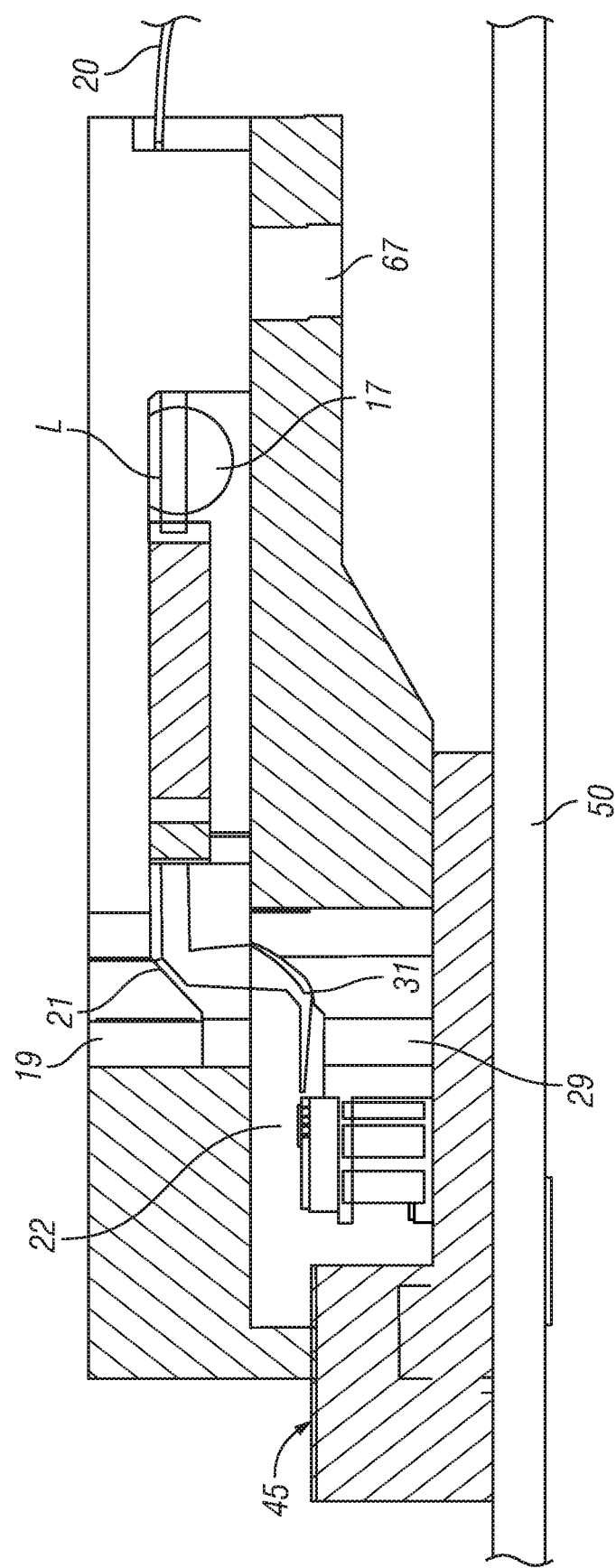
Figure 7A:
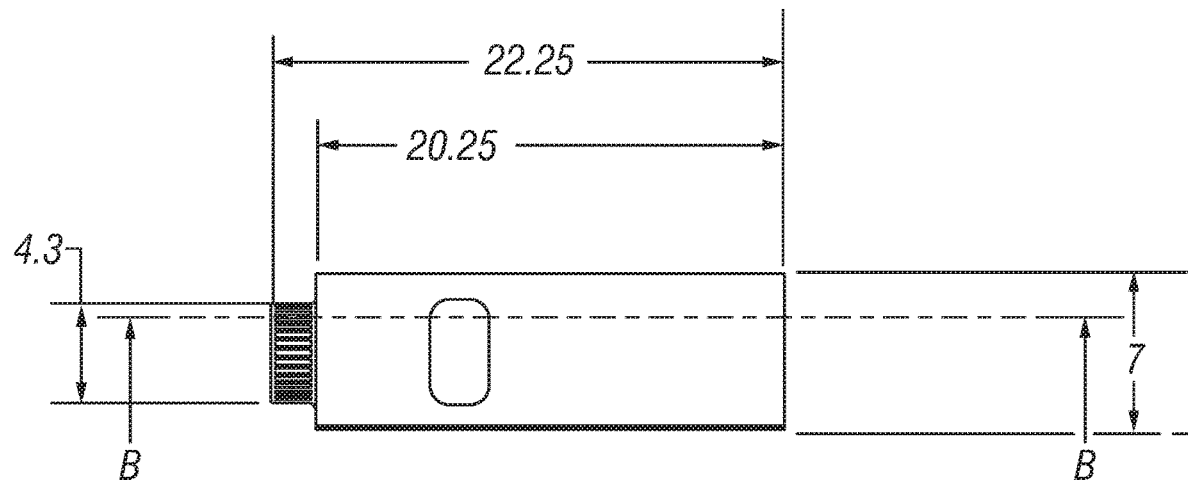
FIGS. 7A to 7D depict exemplary dimensions of the hermetic optical subassembly and installation thereof in the QSFP module.
Figure 7B:
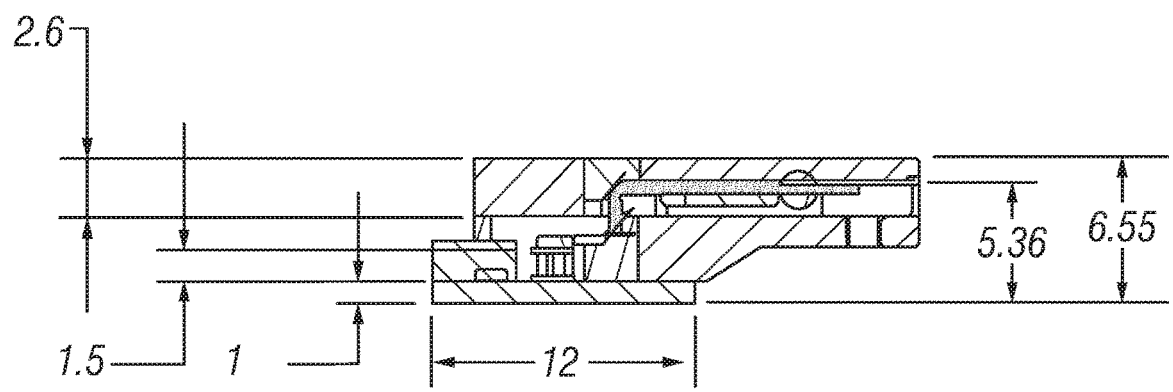
Figure 7C:
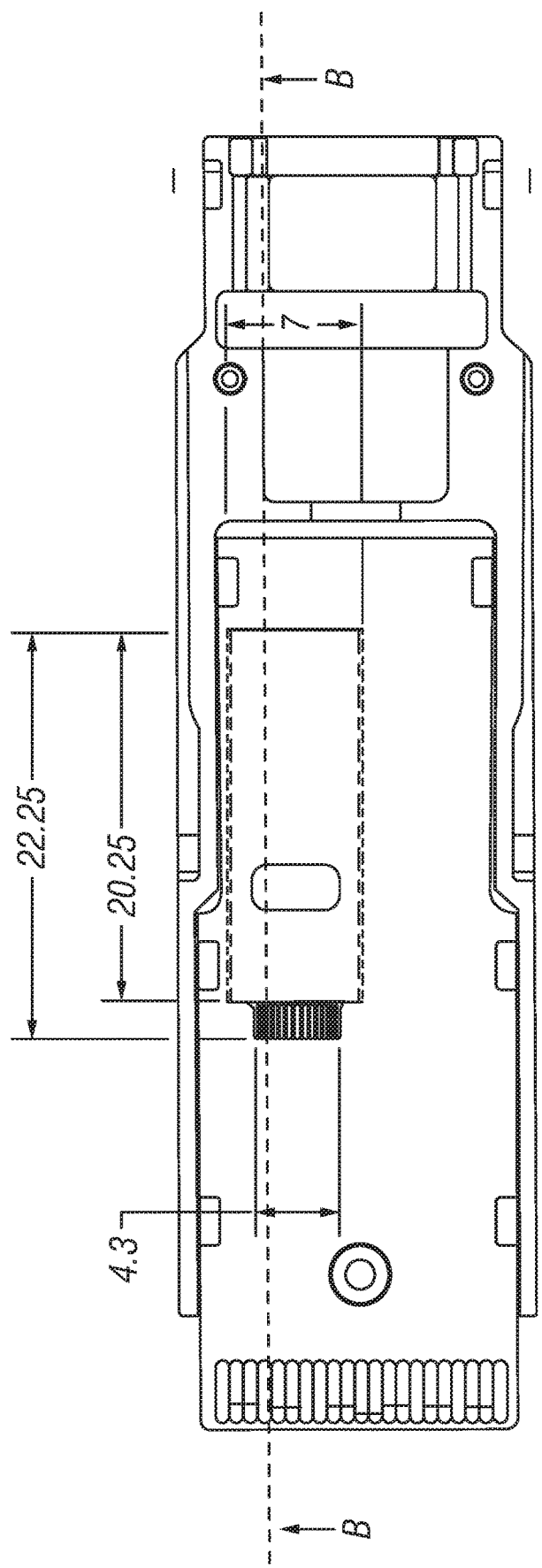
Figure 7D:
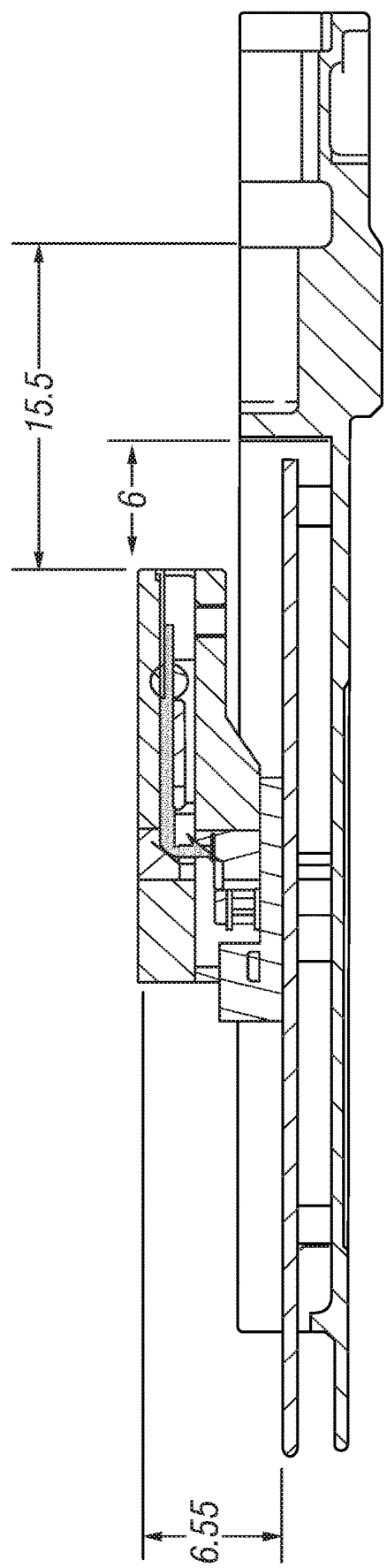

FIG. 6C is a sectional view illustrating the hermetic optical subassembly 10 after assembly as discussed above. The base of the carrier 13 is shown attached to the QSFP28 board 50. The pigtail end of the optical fiber 20 may be terminated in a ferrule (not shown) in an optical connector to provide a connection to an external optical fiber.

After assembly, optical signals can be directed between the photonic device 22 (e.g., EML's) and the optical fiber 20 via the reflective surface 31 of the intermediate optical bench 12 and the reflective surface 21 of the optical bench 11. In the illustrated embodiment, there are four EML's, which output signal are multiplexed through the Mux 23 in the optical bench 11. Given the nature of EML's, their output is parallel to the carrier on which the EML's are mounted. Accordingly, the output signals would be transmitted horizontally, which need to be turned upwards to the level of the Mux 23 and optical fiber 20. The micro mirrors 31 serves to reshape and turn or fold the output signal, which is then collimated before passing through the Mux 23 to be focused at the optical fiber 20. In the past, EML's were not effectively used in TOSA, given the difficulties in obtaining an acceptable optical path. In the illustrated embodiments, the output signals from the EML's are substantially parallel to the input signal to the optical fiber 20 (at least in a vertical direction). With the use of two sets of reflective surfaces, the desired optical effect and optical path can be achieved while maintaining the overall height of the hermetic optical subassembly to a minimum. With the stamped optical benches, it is now possible to incorporate a multiplexer into the hermetic TOSA (or a de-multiplexer in a hermetic ROSA). The smaller and more compact construction improves reliability and preserves optical alignment by reducing the magnitude of thermal expansion due to temperature changes while operating the laser or due to heat from other module components.

FIGS. 7A to 7D depict exemplary dimensions of the hermetic optical subassembly and installation thereof in the QSFP module. (All dimension shown in mm.)

In accordance with the present invention discussed above, it can be seen that a hermetic optical subassembly can be configured with a small form factor, which can be manufacture using high throughput stamping processes. More specifically, the present invention provides a hermetic TOSA having a small package size, with improved manufacturability, throughput, optical alignment tolerance, ease of use, functionality and reliability at reduced costs.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A hermetic optical subassembly, comprising:
   a first optical bench supporting an optical fiber, and comprising at least one first mirror defined by stamping a first malleable metal stock material;
   a second optical bench comprising at least one second mirror defined by stamping a second malleable metal stock material;
   a carrier supporting at least one photonic device,
   wherein the optical fiber, the first mirror, the second mirror and the photonic device are in optical alignment, and the first mirror and the second mirror direct an optical signal between the photonic device and the optical fiber, wherein the optical signal is transmitted between the first mirror and the second mirror without relying on any refractive optical element supported between the first optical bench and the second optical bench, and wherein the first optical bench, the second optical bench and the carrier are coupled to form a hermetic package.

2. The hermetic optical subassembly as in claim 1, wherein the first optical bench is attached to a top of the second optical bench, and the carrier is attached to a bottom of the second optical bench, and wherein the first optical bench has a body made of a metallic material, the second optical bench has a body made of a metallic material, and the carrier is made of a non-electrically conductive material.

3. The hermetic optical subassembly as in claim 1, further comprising an optical element supported on the first optical bench, in optical alignment between the first mirror and the optical fiber, wherein the optical element directs optical signals between the optical fiber and the first mirror.

4. The hermetic optical subassembly as in claim 3, further comprising a plurality of first mirrors, wherein the optical element comprises a filter block supported on the first optical bench, wherein the filter block splits an input optical signal from the optical fiber into a plurality of output optical signals each having a different wavelength, and wherein the output optical signals are each directed at a corresponding one of the plurality of first mirrors, or wherein the filter block combines a plurality of input optical signals of different wavelength directed from the plurality of mirrors into an output optical signals to the optical fiber.

5. The hermetic optical subassembly as in claim 4, wherein the filter block is a multiplexer that combines a plurality of input optical signals each having a different wavelength into a single output optical signal to be directed to the optical fiber, wherein the photonic device comprises a plurality of transmitters each providing an optical signal of a different wavelength, wherein the first optical bench comprises a plurality of first mirrors and the second optical bench comprises a plurality of second mirrors corresponding to the plurality of first mirrors and corresponding to the plurality of transmitters, and wherein corresponding transmitter, first mirror and second mirror are in optical alignment, and corresponding first mirror and corresponding second mirror direct corresponding optical signal provided by corresponding transmitter to the multiplexer.

6. The hermetic optical subassembly as in claim 5, wherein the photonic device comprises a plurality of receivers each receiving an optical signal of a different wavelength, wherein the multiplexer operates in reverse to separate a single input optical signal directed from the optical fiber into a plurality of output optical signals each having a different wavelength to be directed to the respective receivers, wherein corresponding first mirror and corresponding second mirror direct corresponding output optical signal to corresponding receiver.

7. The hermetic optical subassembly as in claim 4, wherein the filter block is a demultiplexer that splits a single input optical signal from the optical fiber into a plurality of output optical signals each having a different wavelength, wherein the photonic device comprises a plurality of receivers each receiving an optical signal of a different wavelength, wherein the first optical bench comprises a plurality of first mirrors and the second optical bench comprises a plurality of second mirrors corresponding to the plurality of first mirrors and corresponding to the plurality of receivers, and wherein corresponding receiver, first mirror and second mirror are in optical alignment, and corresponding first mirror and corresponding second mirror direct corresponding optical signal from the demultiplexer to the corresponding receiver.

8. The hermetic optical subassembly as in claim 7, wherein the photonic device further comprises a plurality of transmitters each providing an optical signal of a different wavelength, wherein the demultiplexer operates in reverse to combine a plurality of the optical signals each of a different wavelength from the respective transmitters into a single output optical signal to be directed to the optical fiber, wherein corresponding first mirror and corresponding second mirror direct corresponding optical signal from corresponding transmitter.

9. The hermetic optical subassembly as in claim 1, wherein the photonic device is at least a transmitter or a receiver.

10. The hermetic optical subassembly as in claim 1, further comprising a thermoelectric cooler supported on the carrier, and wherein the photonic device comprises an edge emitting laser supported on the thermoelectric cooler.

11. The hermetic optical subassembly as in claim 10, wherein the carrier includes a vertically extending wall made of a hermetic material, wherein electrical traces pass through the vertically extending wall to provide electrical access from exterior of the hermetic package to the photonic device disposed within the hermetic package, and wherein the electrical traces are substantially coplanar with the edge emitting laser.

12. The hermetic optical subassembly as in claim 11, wherein the carrier is made of a high temperature cofired ceramic material.

13. A method of forming a hermetic optical subassembly, comprising:
   providing a first optical bench supporting an optical fiber;
   stamping at least one first mirror on the first optical bench from a first malleable metal stock material;
   providing a second optical bench comprising at least one second mirror;
   stamping at least one second mirror on the second optical bench from a second malleable metal stock material, wherein the second mirror has an aspherical concave reflective profile;
   providing a carrier supporting at least one photonic device;
   optically aligning the optical fiber, the first mirror, the second mirror and the photonic device, wherein the first mirror and the second mirror direct an optical signal between the photonic device and the optical fiber, and wherein the optical signal is transmitted between the first mirror and the second mirror without relying on any refractive optical element supported between the first optical bench and the second optical bench; and hermetically attaching the first optical bench, the second optical bench and the carrier to form a hermetic package.

14. The method as in claim 13, wherein the first optical bench is attached to a top of the second optical bench, and the carrier is attached to a bottom of the second optical bench, and wherein the first optical bench has a body made of a metallic material, the second optical bench has a body made of a metallic material, and the carrier is made of a non-electrically conductive material.

15. The method as in claim 13, further comprising an optical element supported on the first optical bench, in optical alignment between the first mirror and the optical fiber, wherein the optical element directs optical signals between the optical fiber and the first mirror.

16. The method as in claim 15, wherein the optical element comprises a filter block supported on the first optical bench, wherein the filter block splits an input optical signal from the optical fiber into a plurality of output optical signals each having a different wavelength, and wherein the output optical signals are each directed at a corresponding one of the plurality of mirrors, or wherein the filter block combines a plurality of input optical signals of different wavelength directed from the plurality of mirrors into an output optical signals to the optical fiber.

17. The method as in claim 16, wherein the filter block is a multiplexer that combines a plurality of input optical signals each having a different wavelength into a single output optical signal to be directed to the optical fiber, wherein the photonic device comprises a plurality of transmitters each providing an optical signal of a different wavelength, wherein the first optical bench comprises a plurality of first mirrors and the second optical bench comprises a plurality of second mirrors corresponding to the plurality of first mirrors and corresponding to the plurality of transmitters, and wherein corresponding transmitter, first mirror and second mirror are in optical alignment, and corresponding first mirror and corresponding second mirror direct corresponding optical signal provided by corresponding transmitter to the multiplexer.

18. The method as in claim 17, wherein the photonic device comprises a plurality of receivers each receiving an optical signal of a different wavelength, wherein the multiplexer operates in reverse to separate a single input optical signal directed from the optical fiber into a plurality of output optical signals each having a different wavelength to be directed to the respective receivers, wherein corresponding first mirror and corresponding second mirror direct corresponding output optical signal to corresponding receiver.

19. The method as in claim 16, wherein the filter block is a demultiplexer that splits a single input optical signal from the optical fiber into a plurality of output optical signals each having a different wavelength, wherein the photonic device comprises a plurality of receivers each receiving an optical signal of a different wavelength, wherein the first optical bench comprises a plurality of first mirrors and the second optical bench comprises a plurality of second mirrors corresponding to the plurality of first mirrors and corresponding to the plurality of receivers, and wherein corresponding receiver, first mirror and second mirror are in optical alignment, and corresponding first mirror and corresponding second mirror direct corresponding optical signal from the demultiplexer to the corresponding receiver.

20. The method as in claim 19, wherein the photonic device further comprises a plurality of transmitters each providing an optical signal of a different wavelength, wherein the demultiplexer operates in reverse to combine a plurality of the optical signals each of a different wavelength from the respective transmitters into a single output optical signal to be directed to the optical fiber, wherein corresponding first mirror and corresponding second mirror direct corresponding optical signal from corresponding transmitter.

* * * * *